(12) United States Patent
Tahara

(10) Patent No.: US 8,009,633 B2
(45) Date of Patent: Aug. 30, 2011

(54) REMOTE REPRODUCTION SYSTEM AND REMOTE REPRODUCTION METHOD

(75) Inventor: Kazushi Tahara, Tokyo (JP)

(73) Assignee: Pioneer Corporation, Tokyo (JP)

( * ) Notice: Subject to any disclaimer, the term of this patent is extended or adjusted under 35 U.S.C. 154(b) by 1103 days.

(21) Appl. No.: 11/301,239

(22) Filed: Dec. 13, 2005

(65) Prior Publication Data

US 2006/0128370 A1   Jun. 15, 2006

(30) Foreign Application Priority Data

Dec. 15, 2004   (JP) ................................. 2004-362363

(51) Int. Cl.
*H04W 4/00* (2009.01)

(52) U.S. Cl. ......... 370/332; 370/235; 455/506; 455/441

(58) Field of Classification Search .................. 455/441, 455/436, 517, 506, 456; 370/330, 331, 332, 370/333, 334, 432, 235, 310, 352, 312
See application file for complete search history.

(56) References Cited

U.S. PATENT DOCUMENTS

| | | | |
|---|---|---|---|
| 5,424,747 A * | 6/1995 | Chazelas et al. | 342/70 |
| 6,061,021 A * | 5/2000 | Zibell | 342/418 |
| 6,400,320 B1 * | 6/2002 | Stilp et al. | 342/457 |
| 6,453,168 B1 * | 9/2002 | McCrady et al. | 455/517 |
| 6,597,906 B1 | 7/2003 | Van Leeuwen et al. | |
| 6,711,408 B1 * | 3/2004 | Raith | 455/440 |
| 6,718,174 B2 * | 4/2004 | Vayanos | 455/456.1 |
| 7,039,419 B2 * | 5/2006 | Ono | 455/456.1 |
| 7,151,941 B2 * | 12/2006 | Vanttinen et al. | 455/456.2 |
| 7,251,491 B2 * | 7/2007 | Jha | 455/441 |
| 2004/0085909 A1 * | 5/2004 | Soliman | 370/252 |

FOREIGN PATENT DOCUMENTS

| | | |
|---|---|---|
| JP | 2002-078020 | 3/2002 |
| JP | 2003-188802 | 7/2003 |
| JP | 2004-064538 | 2/2004 |
| JP | 2004-153620 | 5/2004 |
| JP | 2004-193995 | 7/2004 |
| JP | 2004-248160 | 9/2004 |
| JP | 2004-297479 | 10/2004 |

* cited by examiner

*Primary Examiner* — Dmitry H Levitan
*Assistant Examiner* — Dady Chery
(74) *Attorney, Agent, or Firm* — Nixon and Vanderhye, P.C.

(57) ABSTRACT

A communication condition between the transmitting apparatus and the mobile receiving apparatus at a future position of the mobile receiving apparatus is estimated on the basis of the position information and the information materials of communication environments. A transmission rate which is related to the transmission of the content data from the transmitting apparatus to the mobile receiving apparatus, is changed on the basis of the estimation result. Alternatively, the transmission of the content data from the transmitting apparatus to the mobile receiving apparatus is temporarily stopped, on the basis of the estimation result.

25 Claims, 12 Drawing Sheets

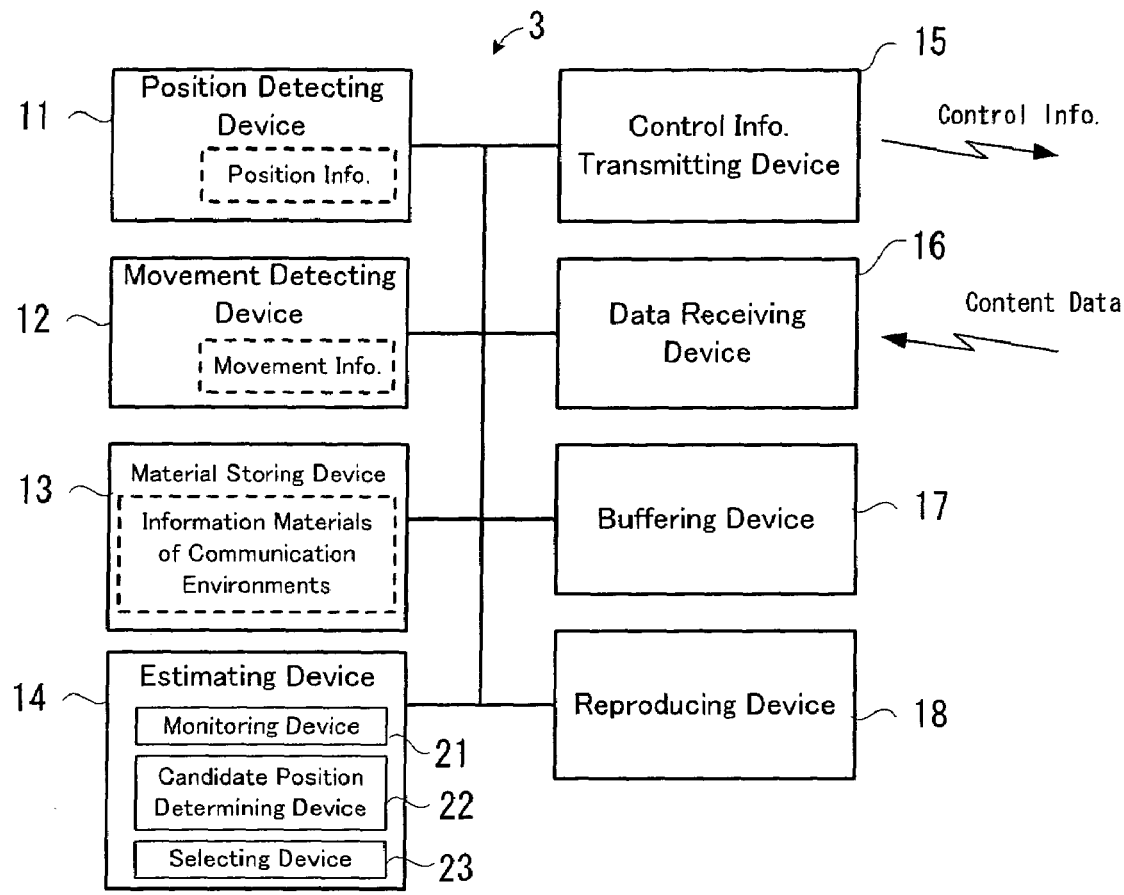
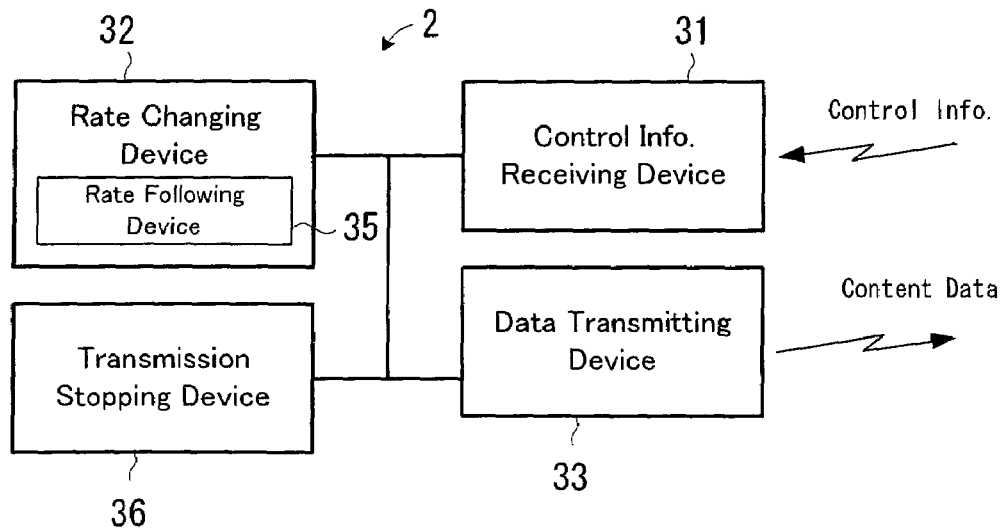

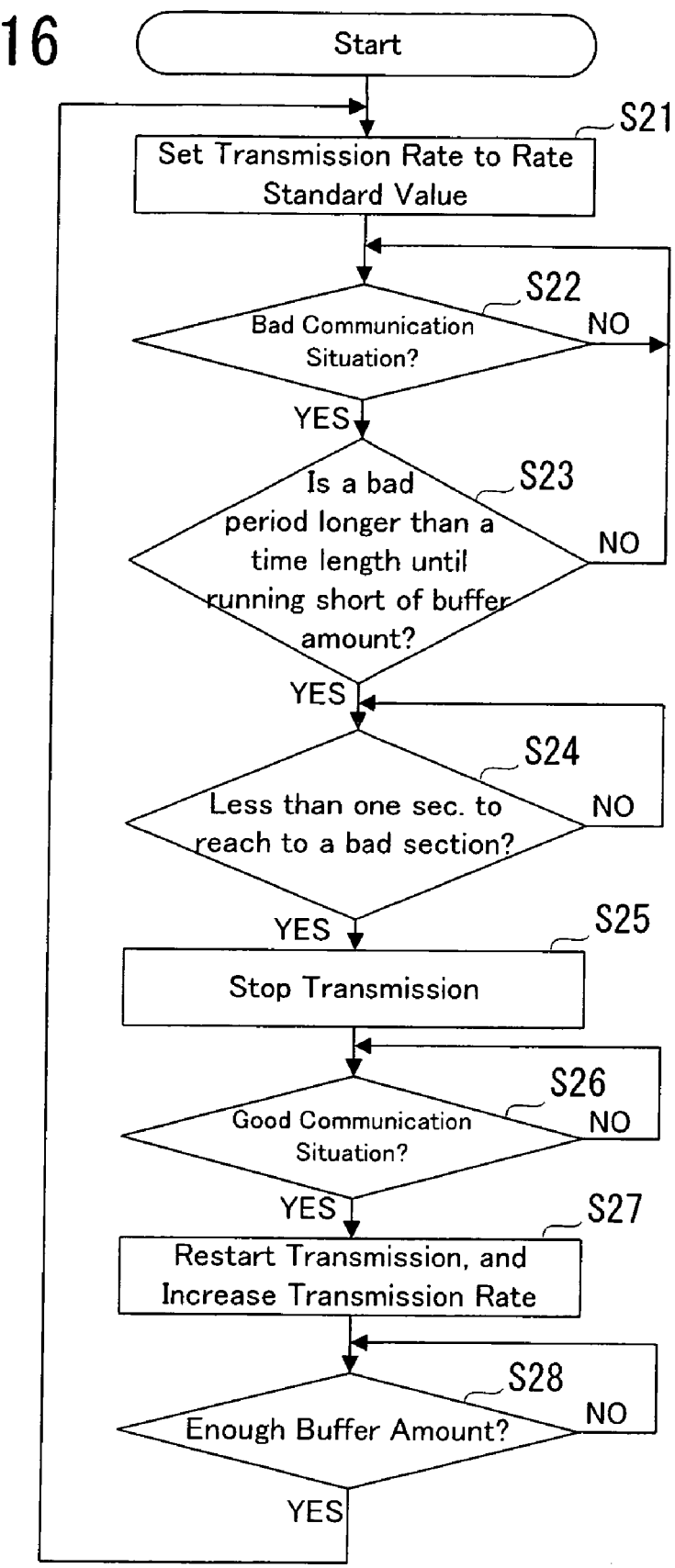

REMOTE REPRODUCTION SYSTEM AND REMOTE REPRODUCTION METHOD

BACKGROUND OF THE INVENTION

1. Field of the Invention

The present invention relates to a remote reproduction system and a remote reproduction method in which communication is made between a transmitting apparatus and a mobile receiving apparatus which are connected to each other mainly through a mobile wireless network, in which information is transmitted from the transmitting apparatus to the mobile receiving apparatus, and in which the information can be reproduced in the mobile receiving apparatus, as well as a computer program product to realize the system and the method.

2. Description of the Related Art

Nowadays, information communication through the Internet is generalized, and AV (Audio Visual) equipment and a network appliance which have a function of accessing the Internet to make the information communication are used at home. For example, as the AV equipment, an information recording/reproducing apparatus for video and music, such as a DVD recorder, is spread. On the other hand, a mobile terminal, such as a mobile phone, a PDA (Personal Digital Assistance), a car navigation apparatus, and a mobile personal computer, is also spread. Moreover, such a technology is also being spread that the information communication is made between the AV equipment and the mobile terminal through a mobile wireless network, such as a mobile phone network, an IMT (International Mobile Telecommunication)-2000, a PHS (Personal Handyphone System), a wireless LAN (Local Area Network), and a wireless network through the Internet.

By the way, if a user can listen to many songs and many pieces of music or watch a few or several or more movies outside, that is useful. One method to realize this is to provide a mobile information reproducing apparatus, such as a MP3 player and a multimedia player, with a storage device with a large storage capacity. Namely, the storage device which has a storage capacity large enough to store the content data of many songs or movies is incorporated into the mobile information reproducing apparatus. The user stores the content data of many songs or movies into the mobile information reproducing apparatus at home before going out. Then, the user goes out with the mobile information reproducing apparatus, and operates the mobile information reproducing apparatus outside to reproduce the songs or movies. Recently, the mobile information reproducing apparatus provided with a hard disk with a storage capacity of several tens megabytes to several tens gigabytes has been popular.

On the other hand, another method for the user to listen to many songs or watch a few or several or more movies outside is to make wireless communication between the mobile terminal of a portable type and the AV equipment. Namely, an information reproduction function is incorporated into the mobile terminal of a portable type. Then, the information communication is made between the mobile terminal and the AV equipment located at home through the mobile wireless network, to thereby operate the AV equipment by using the mobile terminal and transfer the content data of songs or movies from the AV equipment to the mobile terminal. Then, the content data is reproduced on the mobile terminal. If the size of content data to be reproduced is large, such as movies, streaming reproduction is performed on the mobile terminal. Namely, while the content data is transferred from the AV equipment to the mobile terminal, the content data is reproduced in real time, simultaneously.

Hereinafter, the technology of making the wireless communication between the transmitting apparatus, such as the AV equipment, and the mobile receiving apparatus, such as the mobile terminal; of transferring the content data and/or other information, such as songs, music, movies and texts, from the transmitting apparatus to the mobile receiving apparatus; and of reproducing the data and/or information on the mobile receiving apparatus is referred to as "remote reproduction" or "remote playback."

According to the remote reproduction technology, the content data of songs or movies can be reproduced while wirelessly transferred from the AV equipment to the mobile terminal, so that it is unnecessary to provide the mobile terminal with a storage device which is large, heavy, and nondurable, such as a hard disk. Thus, it is possible to easily provide a mobile terminal which is small, light, and excellent in portability and durability. Therefore, the user can easily listen to music or watch movies outside. Moreover, according to the remote reproduction technology, the user can freely listen to music or watch movies. For example, the user can watch a movie at home with the AV equipment, stop watching in the middle, and later can watch the rest of the movie by using the mobile terminal outside. This kind of thing can be realized, easily.

By the way, the remote reproduction is expected to be performed while the mobile terminal is in motion. Namely, it is expected that the user reproduces the music or movie with the mobile terminal, while traveling by car, train or bicycle.

As the mobile terminal moves, geography around the mobile terminal changes momentarily. Along with this change, the communication condition between the mobile terminal and the AV equipment changes momentarily. For example, it is assumed that a car the user drives travels on an open road with good visibility at one moment; however, it enters a tunnel at a next moment. As a result, the communication environment around the mobile terminal suddenly becomes bad, and the communication condition between the mobile terminal and the AV equipment suddenly becomes bad. This causes bad communication between the mobile terminal and the AV equipment, makes the reproduction of the content data unstable, and in some cases, this distorts audio or video images. This is undesirable.

Moreover, if the streaming reproduction is performed, another problem may occur due to the deteriorating communication condition. For example, if the content data of movies transmitted from the AV equipment cannot be received on the mobile terminal for a long time due to the deteriorating communication condition, the mobile terminal loses a way to obtain the content data which is transmitted in the not-communicable period while maintaining the present streaming reproduction. In this case, a part of the content data cannot be reproduced, and the contents of the movie are lost partially. As a result, the user needs to watch the movie with the discontinuous content. This is undesirable.

SUMMARY OF THE INVENTION

It is therefore a first object of the present invention to provide a remote reproduction system and a remote reproduction method which can stabilize the reproduction of the information on the mobile receiving apparatus even if the communication condition is deteriorated between the transmitting apparatus, such as the AV equipment, and the mobile receiving apparatus, such as the mobile terminal, as well as a computer program product to realize the system and the method.

It is a second object of the present invention to provide a remote reproduction system and a remote reproduction method which can maintain the continuity of contents, such as songs, music or movies, which is reproduced on the mobile receiving apparatus even if the communication condition is deteriorated between the transmitting apparatus and the mobile receiving apparatus, as well as a computer program product to realize the system and the method.

The above object of the present invention can be achieved by a remote reproduction system for making communication between a transmitting apparatus and a mobile receiving apparatus. In the remote reproduction system, the transmitting apparatus and the mobile receiving apparatus are wirelessly connected to each other. The transmitting apparatus transmits content data to the mobile receiving apparatus. The mobile receiving apparatus reproduces the content data received from the transmitting apparatus. The mobile receiving apparatus is provided with: a position detecting device for detecting a current position of the mobile receiving apparatus and for providing position information which indicates the current position; a material storing device for storing therein information materials of communication environments which indicate communication environments at a plurality of positions; an estimating device for estimating a communication condition between the transmitting apparatus and the mobile receiving apparatus at a future position of the mobile receiving apparatus in motion, on the basis of the position information and the information materials of communication environments; a control information transmitting device for transmitting control information necessary to change a transmission rate of the content data, to the transmitting apparatus, in accordance with the communication condition estimated by the estimating device; a data receiving device for receiving the content data from the transmitting apparatus; a buffering device for temporarily storing the content data received by the data receiving device; and a reproducing device for reproducing the content data stored in the buffering device. The transmitting apparatus is provided with: a control information receiving device for receiving the control information from the mobile receiving apparatus; a rate changing device for changing the transmission rate, in accordance with the communication condition estimated by the estimating device, on the basis of the control information received by the control information receiving device; and a data transmitting device for transmitting the content data to the mobile receiving apparatus, in accordance with the transmission rate changed by the rate changing device.

The above object of the present invention can be also achieved by a remote reproduction system for making communication between a transmitting apparatus and a mobile receiving apparatus. In the remote reproduction system, the transmitting apparatus and the mobile receiving apparatus are wirelessly connected to each other. The transmitting apparatus transmits content data to the mobile receiving apparatus. The mobile receiving apparatus reproduces the received content data. The mobile receiving apparatus is provided with: a position detecting device for detecting a current position of the mobile receiving apparatus and for providing position information which indicates the current position; a position information transmitting device for transmitting the position information to the transmitting apparatus; a data receiving device for receiving the content data from the transmitting apparatus; a buffering device for temporarily storing the content data received by the data receiving device; and a reproducing device for reproducing the content data stored in the buffering device. The transmitting apparatus is provided with: a position information receiving device for receiving the position information from the mobile receiving apparatus; a material storing device for storing therein information materials of communication environments which indicate communication environments at a plurality of positions; an estimating device for estimating a communication condition between the transmitting apparatus and the mobile receiving apparatus at a future position of the mobile receiving apparatus in motion, on the basis of the position information and the information materials of communication environments; a rate changing device for changing the transmission rate, in accordance with the communication condition estimated by the estimating device; and a data transmitting device for transmitting the content data to the mobile receiving apparatus, in accordance with the transmission rate changed by the rate changing device.

The above object of the present invention can be also achieved by a mobile receiving apparatus for making communication with a transmitting apparatus to which the mobile receiving apparatus is wirelessly connected, for receiving content data from the transmitting apparatus, and for reproducing the content data. The mobile receiving apparatus is provided with: a position detecting device for detecting a current position of the mobile receiving apparatus and for providing position information which indicates the current position; a material storing device for storing therein information materials of communication environments which indicate communication environments at a plurality of positions; an estimating device for estimating a communication condition between the transmitting apparatus and the mobile receiving apparatus at a future position of the mobile receiving apparatus in motion, on the basis of the position information and the information materials of communication environments; a control information transmitting device for transmitting control information necessary to change a transmission rate of the content data, to the transmitting apparatus, in accordance with the communication condition estimated by the estimating device; a data receiving device for receiving the content data from the transmitting apparatus; a buffering device for temporarily storing the content data received by the data receiving device; and a reproducing device for reproducing the content data stored in the buffering device.

The above object of the present invention can be also achieved by a transmitting apparatus for making communication with a mobile receiving apparatus to which the transmitting apparatus is wirelessly connected, and for transmitting content data to the mobile receiving apparatus so as to reproduce the content data on the transmitting apparatus. The transmitting apparatus is provided with: a position information receiving device for receiving position information, which indicates a current position of the mobile receiving apparatus, from the mobile receiving apparatus; a material storing device for storing therein information materials of communication environments which indicate communication environments at a plurality of positions; an estimating device for estimating a communication condition between the transmitting apparatus and the mobile receiving apparatus at a future position of the mobile receiving apparatus in motion, on the basis of the position information and the information materials of communication environments; a rate changing device for changing the transmission rate, in accordance with the communication condition estimated by the estimating device; and a data transmitting device for transmitting the content data to the mobile receiving apparatus, in accordance with the transmission rate changed by the rate changing device.

The above object of the present invention can be also achieved by a remote reproduction method of making communication between a transmitting apparatus and a mobile receiving apparatus, which are wirelessly connected to each other, of transmitting content data from the transmitting apparatus to the mobile receiving apparatus, and of reproducing the content data on the mobile receiving apparatus. The mobile receiving method is provided with: a position detecting process of detecting a current position of the mobile receiving apparatus; a movement detecting process of detecting movement of the mobile receiving apparatus; an estimating process of estimating a communication condition between the transmitting apparatus and the mobile receiving apparatus at a future position of the mobile receiving apparatus in motion, on the basis of the current position of the mobile receiving apparatus which is detected in the position detecting process, the movement of the mobile receiving apparatus which is detected in the movement detecting process, and the information materials of communication environments indicating communication environments at a plurality of positions, which are stored in advance; a rate changing process of changing the transmission rate, in accordance with the communication condition estimated in the estimating process; and a data transmitting process of transmitting the content data from the transmitting apparatus to the mobile receiving apparatus, in accordance with the transmission rate changed in the rate changing process.

The above object of the present invention can be also achieved by a computer program product in a computer-readable medium for realizing a remote reproduction method of transmitting content data from a first computer to a second computer and of reproducing the content data on the second computer, in a computer system provided with the first computer and the second computer, which are wirelessly connected to each other and which can mutually make communication, the remote reproduction method provided with: a position detecting process of detecting a current position of the second computer; a movement detecting process of detecting movement of the second computer; an estimating process of estimating a communication condition between the first computer and the second at a future position of the second computer in motion, on the basis of the current position of the second computer which is detected in the position detecting process, the movement of the second computer which is detected in the movement detecting process, and the information materials of communication environments indicating communication environments at a plurality of positions, which are stored in advance; a rate changing process of changing the transmission rate, in accordance with the communication condition estimated in the estimating process; and a data transmitting process of transmitting the content data from the first computer to the second computer, in accordance with the transmission rate changed in the rate changing process.

BRIEF DESCRIPTION OF THE DRAWINGS

FIG. 2 is a block diagram showing a mobile receiving apparatus in the remote reproduction system in the first embodiment of the present invention;

FIG. 3 is a block diagram showing a transmitting apparatus in the remote reproduction system in the first embodiment of the present invention;

FIG. 16 is a flowchart showing control related to estimation of a communication condition and stop of transmission in the example of the remote reproduction system of the present invention.

DETAILED DESCRIPTION OF THE PREFERRED EMBODIMENTS

The embodiments of the present invention will be explained.

Structure of Remote Reproduction System

Figure 1:
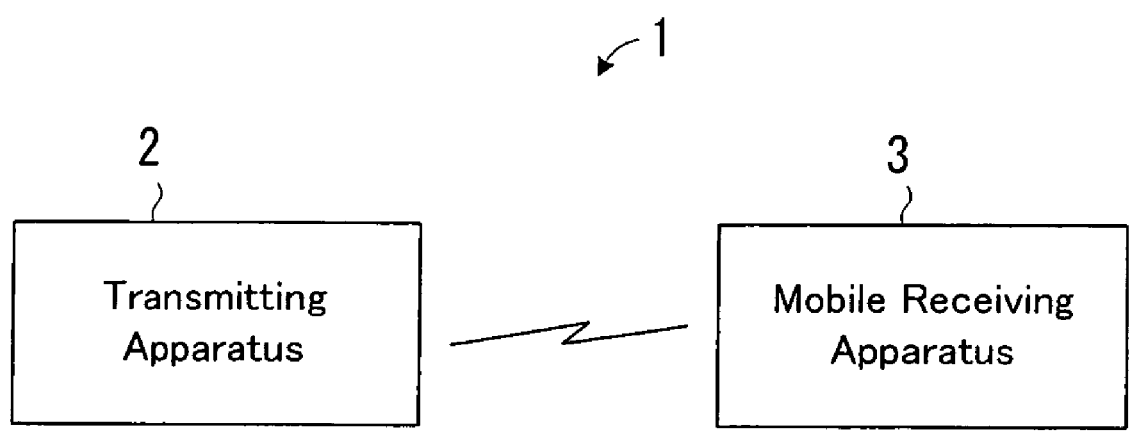
FIG. 1 is a block diagram showing a first embodiment of a remote reproduction system of the present invention.

A first embodiment of the remote reproduction system of the present invention will be discussed. FIG. 1 shows the first embodiment of the remote reproduction system. As shown in FIG. 1, a remote reproduction system 1 is provided with a transmitting apparatus 2 and a mobile receiving apparatus 3. The transmitting apparatus 2 and the mobile receiving apparatus 3 are wirelessly connected. In the remote reproduction system 1, the transmitting apparatus 2 and the mobile receiving apparatus 3 make communication with each other, and the transmitting apparatus 2 transmits content data to the mobile receiving apparatus 3. The mobile receiving apparatus 3 receives and reproduces the content data. The content data is digital data, such as music, songs, video images, and texts.

The wireless by which the transmitting apparatus 2 and the mobile receiving apparatus 3 are connected is, for example, a mobile phone network, an IMT-2000, a PHS, a wireless LAN, or the like. Incidentally, the entire communication line between the transmitting apparatus 2 and the mobile receiving apparatus 3 is not necessarily wireless, and a part of the communication line may be a wired-line. For example, nowadays, there are spread communication lines in which the Internet and the mobile phone network are connected through a connecting apparatus, such as a mobile internet server. The communication line in which the wired-line and the wireless are mixed may be also used as the communication line between the transmitting apparatus 2 and the mobile receiving apparatus 3. If such a communication line is used, the transmitting apparatus 2 is connected to the Internet through a fixed phone line (wired line), for example.

FIG. 2 shows the structure of the mobile receiving apparatus 3. The mobile receiving apparatus 3 has functions of making wireless or partially wired communication between the transmitting apparatus 2 and another external equipment, receiving the content data from the transmitting apparatus 2, and reproducing the content data. The mobile receiving apparatus 3 is, for example, a mobile phone, a PDA, a car navigation apparatus, a mobile personal computer, or the like, which has the information reproduction function. The mobile receiving apparatus 3 is excellent in portability and transportability and is designed for moving outside. The mobile receiving apparatus 3, however, is not necessarily an apparatus directly carried by a user, and may be an apparatus which is mounted on a car or the like and which is designed for moving with the car, as in a car navigation apparatus. Moreover, the mobile receiving apparatus 3 is a medical computer mounted on an ambulance, or may be a computer for driving control mounted near the driver's seat of a bus, for example.

As shown in FIG. 2, the mobile receiving apparatus 3 is provided with: a position detecting device 11; a movement detecting device 12; a material storing device 13; an estimating device 14; a control information transmitting device 15; a data receiving device 16; a buffering device 17; and a reproducing device 18.

The position detecting device 11 detects the current position of the mobile receiving apparatus 3, and provides position information which indicates the current position. The position detecting device 11 is, for example, a GPS (Global Positioning System) receiver. The position information is a value which indicates latitude and longitude which represents the current position of the mobile receiving apparatus 3. For the position detection on the position detecting device 11, a GPS positioning method or the like can be used, for example. Moreover, if the mobile receiving apparatus 3 is a car navigation apparatus, autonomous navigation or map matching or the like can be used in combination, for the position detection by the position detecting device 11. In this case, an angular velocity sensor, a velocity sensor, map information, or the like are added, as the constitutional elements of the position detecting device 11. Moreover, the position detecting device 11 is not limited to the GPS receiver. For example, as the structure of the position detecting device 11, it is also possible to adopt a structure of obtaining the position information from a PHS base station, or a structure of obtaining the position information from a hot spot or a ubiquitous terminal in a ubiquitous network.

The movement detecting device 12 detects the movement direction and/or the movement velocity of the mobile receiving apparatus 3, and provides movement information which indicates the movement direction and/or the movement velocity. If the mobile receiving apparatus 3 is an on-vehicle apparatus, as in a car navigation apparatus, the movement detecting device 12 is provided with an acceleration sensor; an angular velocity sensor; a velocity sensor; or the like. Incidentally, if it is possible to obtain the movement direction and/or the movement velocity of the mobile receiving apparatus 3, on the basis of the position information provided by the position detecting device 11, the movement detecting device 12 may be removed from the mobile receiving apparatus 3. For example, if the mobile receiving apparatus 3 is a mobile terminal of a portable type, such as a mobile phone, a PDA, and a mobile personal computer, it is possible to estimate the movement direction and the movement velocity of the mobile receiving apparatus 3, from two or more pieces of the position information which are obtained in a short time by the GPS positioning method. In this case, the movement detecting device 12 is not necessarily required.

The material storing device 13 is a storage apparatus which stores therein information materials of communication environments which indicate communication environments at a plurality of positions on earth. The material storing device 13 is preferably a storage apparatus which can hold the information for a long time, such as a nonvolatile semiconductor memory (e.g. a flash memory) and a hard disk. Moreover, the material storing device 13 may be provided with a disk drive and may record the information materials of communication environments onto a recording disk.

The information materials of communication environments are helpful to determine communication environments at a plurality of positions on earth. The information materials of communication environments are stored in the material storing device 13, as digital data, for example. It is preferable that the information materials of communication environments are ideally materials which allow the determination of communication environments in various places within a human acting area, such as on the ground, underground, at sea, undersea, and in air. However, the information materials of communication environments may be materials which allow the determination of communication environments on the ground and underground in Asia, in Japan, or in Tokyo, or the like, for example.

Specifically, the information materials of communication environments are data in which the evaluation of good or bad communication environments at a plurality of positions on earth is written in advance. For example, the ground and underground in Japan are divided into 100 meter square areas. Then, the geographical features or topographical features of each area are analyzed, or a field study is actually conducted in each area, to thereby evaluate good or bad communication environments in each area. Then, the data in which the evaluation result is recorded for each area is prepared. Such data is used as the information materials of communication environments. Incidentally, the size of the division area is not limited to 100 meter square areas, and may be determined, as occasion demands, depending on the movement aspect of the mobile receiving apparatus (by bicycle or on foot, etc.) or required estimation accuracy. Moreover, the evaluation level of the communication environment may be two levels of "good" or "bad", or may be five levels of "very good", "good", "average", "bad", and "very bad".

Moreover, the information materials of communication environments may be data in which the geographical features or topographical features of each area at a plurality of positions on earth are written in advance. For example, the information materials of communication environments may be data which indicates that the ground and underground in Japan are divided into 100 meter square areas and that each area is on the ground, underground, in the canyon of buildings, in an arcade, in a tunnel, under the elevated, at the top of a mountain, on a flat, or the like. For example, if a certain area is on the ground, at the top of a mountain, or on a flat, the communication environment is good. On the other hand, if the area is in the canyon of buildings, in an arcade, under the elevated, or in a tunnel, the communication environment is bad. As described above, if the geographical features or topographical features of each area can be known, then, it is possible to determine the communication environment at a position in the area.

Moreover, the information materials of communication environments may be map information. On a map, there are recorded the position of a road on the ground, the position of an underground passage, the position of an arcade, the position of a tunnel, and the like. Therefore, with reference to the map information, it is possible to know whether a certain position is on a road on the ground or in a tunnel, or the like. Then, if the position is on an open road on the ground, the communication environment is good. On the other hand, if the position is in a tunnel, the communication environment is bad. As described above, it is possible to determine the communication environment of a certain position with reference to the map information.

The estimating device 14 estimates the communication condition between the transmitting apparatus 2 and the mobile receiving apparatus 3 at a future position of the mobile receiving apparatus 3 in motion, on the basis of the position information, the movement information, and the information materials of communication environments.

At first, the estimating device 14 detects or determines the future position of the mobile receiving apparatus 3 in motion. The estimating device 14 performs the detection or determination on the basis of the position information and the movement information. For example, it recognizes the current position of the mobile receiving apparatus 3, on the basis of the position information. Then, it recognizes the movement direction and the movement velocity of the mobile receiving apparatus 3, on the basis of the movement information. Then, it performs operation or calculation, on the basis of the position information, the movement direction, and the movement velocity, and recognizes the position of the mobile receiving apparatus 3 after a lapse of a predetermined time (e.g. 1 sec to several minutes). Incidentally, the map information may be also used in the recognition.

Incidentally, if the movement direction and the movement velocity of the mobile receiving apparatus 3 can be estimated from two or more pieces of the position information which are obtained in a short time by the GPS positioning method, the estimating device 14 can recognize the movement direction and the movement velocity of the mobile receiving apparatus on the basis of only the position information.

Then, the estimating device 14 examines the communication environment at the future position of the mobile receiving apparatus 3. This examination is performed on the basis of the information materials of communication environments. Then, the estimating device 14 determines that the communication environment is good if the future position is on an open road on the ground, and determines that the communication environment is bad if the future position is in a tunnel.

The estimating device 14 is provided with: an operation processing device; and a control program which describes such an estimation procedure, or the like.

Moreover, the estimating device 14 is provided with a monitoring device 21 for sequentially monitoring a future change in the communication condition by continuing to sequentially estimate the communication condition at the future position (e.g. a position after a lapse of a predetermined time) of the mobile receiving apparatus 3 in motion. For example, it is assumed that the mobile receiving apparatus 3 is moving at 60 km per hour. Then, as described above, it is also assumed that the information materials of communication environments are data in which the ground and underground in Japan are divided into 100 meter square areas, in which the good or bad communication environment of each area is evaluated, and in which the evaluation result is recorded for each area. In this case, it takes 6 seconds for the mobile receiving apparatus 3 to pass one area. In such a case, the monitoring device 21 continues the estimation of the communication condition at a position after a lapse of 6 seconds of the mobile receiving apparatus 3, for example, every 3 seconds.

Moreover, a candidate position determining device 22 and a selecting device 23 may be added to the estimating device 14. The candidate position determining device 22 is a device for determining a plurality of candidate positions to which the mobile receiving apparatus will likely move in the future, on the basis of the position information and the movement information. Moreover, the selecting device 23 is a device for examining the communication condition at each of the plurality of candidate positions, on the basis of the information materials of communication environments, for selecting a candidate position whose communication condition is the worst, from the plurality of candidate positions, and for providing the communication condition at the selected candidate position as an estimation result. The candidate position determining device 22 and the selecting device 23 are more effective if a car equipped with the mobile receiving apparatus 3 is approaching an intersection and it is incapable to estimate whether this car will go straight, turn right, or turn left, at the intersection in the future. Namely, in this case, the candidate position determining device 22 determines a future position in assuming the car goes straight, a future position in assuming the car turns right, and a future position in assuming the car turns left, as the candidate positions. Then, the selecting device 23 examines the communication condition at each of the three candidate positions, and selects a candidate position whose communication condition is the worst, from the three candidate positions. Then, the selecting device 23 provides the communication condition at the selected candidate position, as the estimation result of the estimating device 14. Incidentally, the details of the estimation function of the estimating device 14 will be discussed later.

The control information transmitting device 15 transmits control information necessary to change the transmission rate of the content data, to the transmitting apparatus 2, in accordance with the communication condition estimated by the estimating device 14. The control information transmitting device 15 is a wireless transmitter, for example. The control information may be information which directly indicates the good or bad communication condition estimated by the estimating device 14. Moreover, the control information may be a command to designate the transmission rate which depends on the communication condition estimated by the estimating device 14. Incidentally, if the control information is the latter, it is necessary to provide a rate determining device for determining the transmission rate which depends on the communication condition. The rate determining device can be realized by providing the mobile receiving apparatus 3 with a table on which the description of, for example, a three-leveled evaluation of the good or bad communication condition is associated with the description of, for example, three different transmission rate values.

The data receiving device 16 receives the content data from the transmitting apparatus 2. The data receiving device 16 is a wireless receiver, for example.

The buffering device 17 temporarily accumulates or stores the content data received by the data receiving device 16. The buffering device 17 is a semiconductor memory, such as a RAM (Random Access Memory), for example.

The reproducing device 18 has a function of reproducing the content data accumulated or stored in the buffering device 17. The reproducing device 18 is constructed from a decoder having a morphing function, or the like, for example.

FIG. 3 shows the structure of the transmitting apparatus 2. The transmitting apparatus 2 has functions of making wireless or partially wired communication with the mobile receiving apparatus 3 or another external equipment, and of transmitting the content data to the mobile receiving apparatus 3 so as to reproduce the content data on the mobile receiving apparatus 3. The transmitting apparatus 2 is AV equipment or a network appliance (information appliance) which has a communication function with external equipment, for example. The AV equipment is an information recording/reproducing apparatus, for example, and more specifically, a DVD recorder or the like. Moreover, the transmitting apparatus 2 may be a personal home computer which functions as the DVD recorder. The transmitting apparatus 2 does not have portability or transportability, and is left indoors. The transmitting apparatus 2, however, may be an apparatus which has portability or transportability and which can be taken out to the outside if provided with: a memory function having a storage capacity large enough to store the content data of many songs or movies; and an excellent information process capability, as in a high-performance laptop personal computer, for example.

As shown in FIG. 3, the transmitting apparatus 2 is provided with: a control information receiving device 31; a rate changing device 32; and a data transmitting device 33.

The control information receiving device 31 receives the control information from the mobile receiving apparatus 3. The control information receiving device 31 is a wireless or wired receiver, for example. Specifically, for example, if the transmitting apparatus 2 is directly connected to a mobile phone network, or connected to the Internet through a wireless LAN, the control information receiving device 31 and the data transmitting device 33 are a wireless receiver and a wireless transmitter, respectively. On the other hand, for example, if the transmitting apparatus 2 is connected to the Internet through a fixed phone line (wired line), and connected to a mobile wired network through a connecting apparatus, such as a mobile internet server, the control information receiving device 31 and the data transmitting device 33 are a wired receiver and a wired transmitter, respectively.

The rate changing device 32 changes the transmission rate of the content data, in accordance with the communication condition estimated by the estimating device 14, on the basis of the control information received by the control information receiving device 31. The rate changing device 32 is provided with: an operation processing device; and a control program which describes a rate change procedure; or the like.

Moreover, the rate changing device 32 is provided with a rate following device 35 for controlling the transmission rate such that the transmission rate of the content data follows the future change of the communication condition, by continuing to sequentially change the transmission rate of the content data in accordance with the future change of the communication condition which is monitored by the monitoring device 21. For example, it is assumed that the mobile receiving apparatus 3 is moving at 60 km per hour. Then, as described above, the information materials of communication environments in the embodiment are data in which the ground and underground in Japan are divided into 100 meter square areas, in which the good or bad communication environment of each area is evaluated, and in which the evaluation result is recorded for each area. In this case, it takes 6 seconds for the mobile receiving apparatus 3 to pass one area. If the communication environments are changed one after another, like good, bad, good, bad, etc., in the respective areas the mobile receiving apparatus 3 passes, the rate following device 35 continues to change the transmission rate of the content data, at longest, every 6 seconds. Incidentally, the detailed function and operation of the rate following device 35 will be discussed later.

The data transmitting device 33 transmits the content data to the mobile receiving apparatus 3, in accordance with the transmission rate changed by the rate changing device 32. The data transmitting device 33 is a wireless or wired transmitter, for example.

The structure of the transmitting apparatus 2 in the embodiment is as described above; however, in addition to the structure, a transmission stopping device 36 may be added to the transmitting apparatus 2. The transmission stopping device 36 is a device for temporarily stopping the transmission of the content data performed by the data transmitting device 33, in accordance with the communication condition estimated by the estimating device 14. The detailed function of the transmission stopping device 36 will be discussed later.

The remote reproduction system 1 having the above structure operates as follows. If the mobile receiving apparatus 3 is a mobile phone, a PDA, or a mobile personal computer, for example, a user carries the mobile receiving apparatus 3 and walks or travels by bicycle, car, or train. Alternatively, if the mobile receiving apparatus 3 is a car navigation system, for example, the user travels in a car equipped with the mobile receiving apparatus 3. In such a situation, if the user inputs an instruction to start the reproduction of music or movies, to the mobile receiving apparatus 3, communication is started between the transmitting apparatus 2 and the mobile receiving apparatus 3. At first, the data transmitting deice 33 of the transmitting apparatus 2 transmits the content data to the mobile receiving apparatus 3. At this time, if the communication condition is good between the transmitting apparatus 2 and the mobile receiving apparatus 3, the rate changing device 32 sets the transmission rate of the content data to a standard value (rate standard value). By this, the content data is transmitted at the transmission rate with the standard value. The data receiving device 16 of the mobile receiving apparatus 3 receives the content data from the data transmitting deice 33, and stores this data in the buffering device 17. When the amount of the content data stored in the buffering device 17 slightly exceeds a predetermined set value (buffer set value), the reproducing device 18 reads the content data stored in the buffering device 17, and starts the reproduction of the content data.

During the reproduction of the content data, the position detecting device 11 sequentially detects the position of the mobile receiving apparatus 3 in motion, and sequentially updates the position information. The movement detecting device 12 sequentially detects the movement of the mobile receiving apparatus 3 in motion, and sequentially updates the movement information. The estimating device 14 obtains the position information and the movement information, and refers to the information materials of communication environments stored in the material storing device 13, to thereby sequentially estimate the communication condition at the future position of the mobile receiving apparatus 3. The control information transmitting device 15 sequentially generates and updates the control information, on the basis of the estimation result of the estimating device 14, and sequentially transmits the control information to the transmitting apparatus 2.

The control information receiving device 31 of the transmitting apparatus 2 sequentially receives the control information from the control information transmitting device 15. The rate changing device 32 changes the transmission rate of the content data on the basis of the control information. Since the control information is sequentially updated, the rate changing device 32 changes the transmission rate of the content data every time the control information is updated. Basically, as described later, the rate changing device 32 reduces the transmission rate of the content data to have a lower value than the standard value if the estimating device 14 estimates that the communication condition at the future position of the mobile receiving apparatus 3 is bad (first function). By this, when the communication condition at the future position of the mobile receiving apparatus 3 is bad, the amount per unit time of the content data which is transmitted from the data transmitting device 33 to the data receiving device 16 becomes small. On the other hand, the rate changing device 32 increases the transmission rate of the content data to the standard value if the estimating device 14 estimates that the communication condition at the future position of the mobile receiving apparatus 3 is good (second function). By this, when the communication condition at the future position of the mobile receiving apparatus 3 is good, the amount per unit time of the content data which is transmitted from the data transmitting device 33 to the data receiving device 16 becomes large.

On the other hand, for example, if the estimating device 14 estimates that the communication condition at the future position of the mobile receiving apparatus 3 is very bad, the transmission stopping device 36 stops the transmission of the content data performed by the data transmitting device 33. After that, if the communication condition becomes good, the transmission stopping device 36 restarts the transmission of the content data performed by the data transmitting device 33.

Estimation of Communication Condition 1

The estimating device 14 has several functions, with respect to the estimation of the communication condition between the transmitting apparatus 2 and the mobile receiving apparatus 3. The first function of the estimating device 14 is to detect or determine the future position of the mobile receiving apparatus 3 by using the route guide of car navigation in addition to the position information and the movement information, to thereby estimate the communication condition at this position. This function can be preferably used if the mobile receiving apparatus 3 is a car navigation apparatus. Incidentally, the route guide is a function of the car navigation apparatus guiding a path to a destination. If the route guide is performed, the car navigation apparatus selects the path to the destination, and displays the path with a map.

Figure 4:
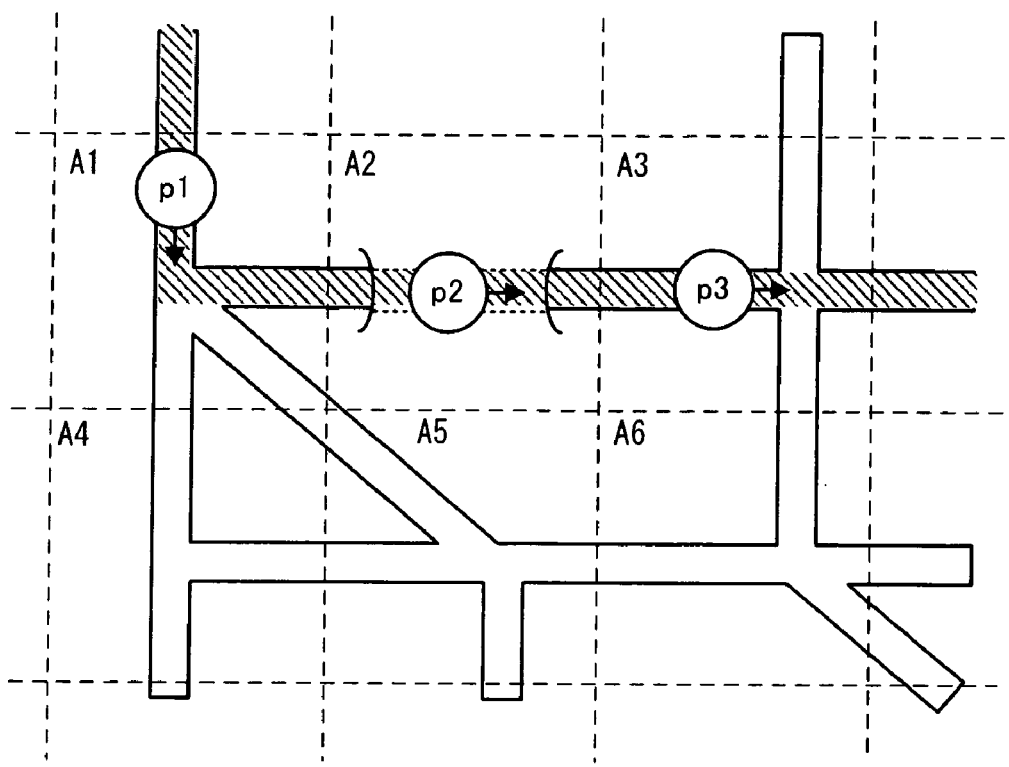
FIG. 4 is an explanatory diagram showing a first estimation function in the remote reproduction system in the first embodiment of the present invention.

FIG. 4 shows a performance example of the first function of the estimating device 14. At first, the estimating device 14 recognizes the current position of the mobile receiving apparatus 3, on the basis of the position information. For example, a point p1 in FIG. 4 represents the current position of the mobile receiving apparatus 3. Then, the estimating device 14 recognizes the movement direction and the movement velocity of the mobile receiving apparatus 3, on the basis of the movement information. When recognizing the movement direction of the mobile receiving apparatus 3, the estimating device 14 refers to a path selected by the performance of the rouge guide. A hatching part in FIG. 4 indicates the path selected by the performance of the rouge guide. Then, the estimating device 14 performs operation or calculation, on the basis of the current position, the movement direction, the path, and the movement velocity, and recognizes the position (future position) of the mobile receiving apparatus 3 after a lapse of a predetermined time (e.g. 6 seconds), for example. Since the path is selected by the performance of the rouge guide, the estimating device 14 can narrow down the movement direction of the mobile receiving apparatus 3 to one direction. As a result, the estimating device 14 can narrow down the position of the mobile receiving apparatus 3 after a lapse of the predetermined time to one position. A point p2 in FIG. 4 represents the position of the mobile receiving apparatus 3 after a lapse of the predetermined time.

Then, the estimating device 14 examines the communication environment at the position of the mobile receiving apparatus 3 after a lapse of the predetermined time, on the basis of the information materials of communication environments. As described above, the information materials of communication environments in the embodiment are data in which the ground and underground in Japan are divided into 100 meter square areas, in which the good or bad communication environment of each area is evaluated, and in which the evaluation result is recorded for each area. Each of areas A1 to A6 in FIG. 4 indicates the divided 100 meter square area. For example, a road in the area A1 is an open road on the ground. Therefore, it is written in the information materials of communication environments that the communication environment in the area A1 is "good". Moreover, a road in the area A2 is in a tunnel. Therefore, it is written in the information materials of communication environments that the communication environment in the area A2 is "bad". In FIG. 4, the position of the mobile receiving apparatus 3 after a lapse of the predetermined time is the point p2, and the p2 is in the area A2. Therefore, the estimating device 14 determines that the communication environment of the mobile receiving apparatus 3 after a lapse of the predetermined time is "bad". Then, in accordance with the determination result, the estimating device 14 estimates that the communication condition after a lapse of the predetermined time between the transmitting apparatus 2 and the mobile receiving apparatus 3 is "bad".

Incidentally, the estimation of the estimating device 14 continuously performed. For example, when the predetermined time elapses and the mobile receiving apparatus 3 moves to the point p2, the estimating device 14 further estimates the communication condition after another lapse of the predetermined time. If the current position is the point p2, the position of the mobile receiving apparatus 3 after a lapse of the predetermined time is a point p3, for example. The point p3 is the area A3. A road in the area A3 is an open road on the ground, so that it is written in the information materials of communication environments that the communication environment in the area A3 is "good". Therefore, the estimating device 14 determines that the communication condition after a lapse of the predetermined time is "good".

According to the first function of the estimating device 14, it is possible to easily and accurately estimate the communication condition.

Estimation of Communication Condition 2

The second function of the estimating device 14 is as follows. Namely, the estimating device 14 (the candidate position determining device 22) determines a plurality of candidate positions to which the mobile receiving apparatus 3 will likely move in the future by using the map information in addition to the position information and the movement information. Then, the estimating device 14 (the selecting device 23) examines the communication condition of each of the plurality of candidate positions, selects a candidate position whose communication condition is the worst, from the plurality of candidate positions, and provides the communication condition at the selected candidate position as the estimation result. This function can be preferably used if the mobile receiving apparatus 3 or the transmitting apparatus 2 has the map information which describes road positions or the like.

Figure 5:
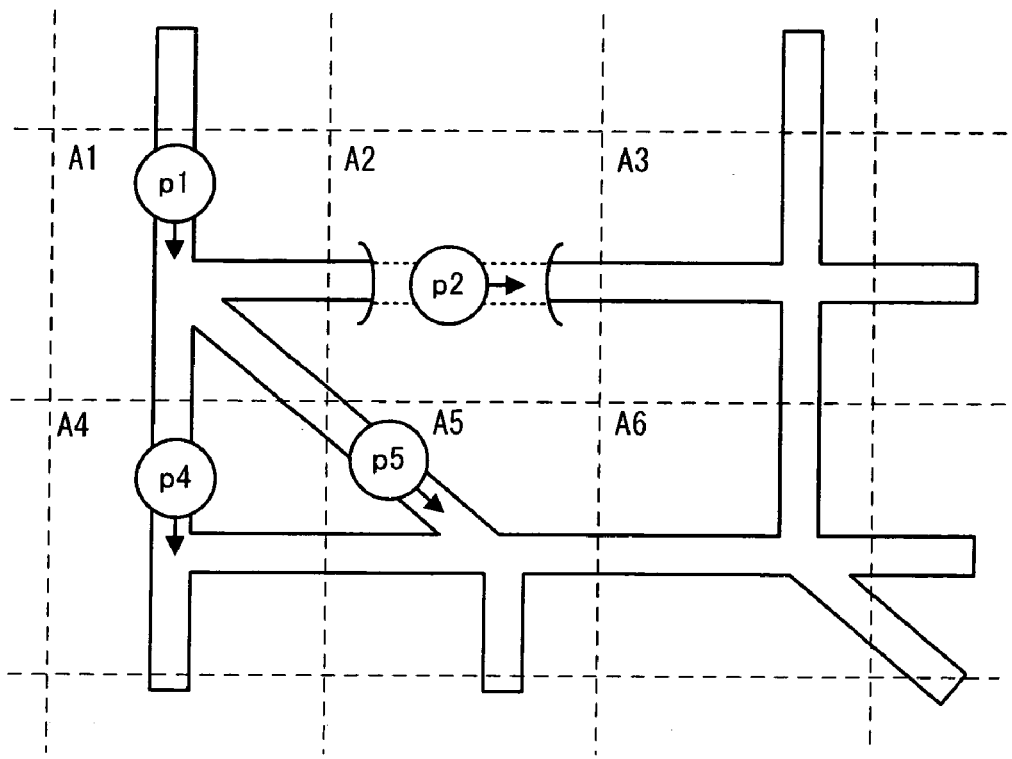
FIG. 5 is an explanatory diagram showing a second estimation function in the remote reproduction system in the first embodiment of the present invention.

FIG. 5 shows a performance example of the second function of the estimating device 14. At first, the estimating device 14 recognizes the current position of the mobile receiving apparatus 3, on the basis of the position information. For example, a point p1 in FIG. 5 represents the current position of the mobile receiving apparatus 3. Then, the estimating device 14 recognizes the movement direction and the movement velocity of the mobile receiving apparatus 3, on the basis of the movement information. When recognizing the movement direction of the mobile receiving apparatus 3, the estimating device 14 (the candidate position determining device 22) determines a plurality of directions in which the mobile receiving apparatus 3 will likely move, on the basis of the rough movement direction of the mobile receiving apparatus 3, which is obtained from the position information, and the position of a road which is obtained from the map information. Moreover, the estimating device 14 (the candidate position determining device 22) determines a plurality of candidate positions to which the mobile receiving apparatus 3 will likely move after a lapse of the predetermined time, on the basis of the plurality of directions and the movement velocity of the mobile receiving apparatus 3 which is obtained from the movement information. Each of points p2, p4, and p5 in FIG. 5 represents the candidate position.

Then, the estimating device 14 (the selecting device 23) examines the communication condition at each of the plurality of candidate positions, on the basis of the information materials of communication environments. The information materials of communication environments are data in which the ground and underground in Japan are divided into 100 meter square areas, in which the good or bad communication environment of each area is evaluated, and in which the evaluation result is recorded for each area. Each of areas A1 to A6 in FIG. 5 indicates the divided 100 meter square area, as in FIG. 4. For example, a road in the area A1 is an open road on the ground. Therefore, it is written in the information materials of communication environments that the communication environment in the area A1 is "good". Moreover, a road in the area A2 is in a tunnel. Therefore, it is written in the information materials of communication environments that the communication environment in the area A2 is "bad". Roads in the areas A4 and A5 are open roads on the ground. Therefore, it is written in the information materials of communication environments that the communication environments in the area A4 and A5 are "good". In FIG. 5, the first candidate position is the point p2, and the p2 is in the area A2. Therefore, the estimating device 14 determines that the communication environment of this candidate position is "bad". Moreover, the second candidate position is the point p4, and the p4 is in the area A4. Therefore, the estimating device 14 determines that the communication environment of this candidate position is "good". The third candidate position is the point p5, and the p5 is in the area A5. Therefore, the estimating device 14 determines that the communication environment of this candidate position is "good".

Then, the estimating device 14 (the selecting device 23) selects a candidate position whose communication condition is the worst, from the three candidate positions, on the basis of the determination result, and provides the communication condition at the selected candidate position as the estimation result. The position whose communication condition is the worst out of the points p2, p4, and p5 in FIG. 5 is the point p2. Therefore, the estimating device 14 (the selecting device 23) selects the point p2. Then, since the communication environment of the point p2 is "bad", the estimating device 14 (the selecting device 23) estimates that the communication condition after a lapse of the predetermined time length between the transmitting apparatus 2 and the mobile receiving apparatus 3 is "bad".

According to the second function of the estimating device 14, i.e. according to the candidate position determining device 22 and the selecting device 23, it is possible to easily estimate the communication condition.

Incidentally, in FIG. 5, if the position to which the mobile receiving apparatus 3 actually moves after a lapse of the predetermined time is not the point p2 but the point p4 or p5, the following process may be performed. Namely, in this case, the mobile receiving apparatus 3 transmits, to the transmitting apparatus 2, a command to change the present transmission rate to a transmission rate suitable for the communication condition of the current position (the point p4 or p5). Then, the rate changing device 32 of the transmitting apparatus 2 changes the transmission rate again, in accordance with the command.

Moreover, when determining a plurality of directions in which the mobile receiving apparatus 3 will likely move, the estimating device 14 may refer to information which indicates the destination (final position to move) of the mobile receiving apparatus 3. By this, it is possible to narrow down the direction in which the mobile receiving apparatus 3 will likely move.

Estimation of Communication Condition 3

The third function of the estimating device 14 is to estimate the communication condition in a range to which the mobile receiving apparatus 3 will likely move, on the basis of the position information and the movement information.

Figure 6:
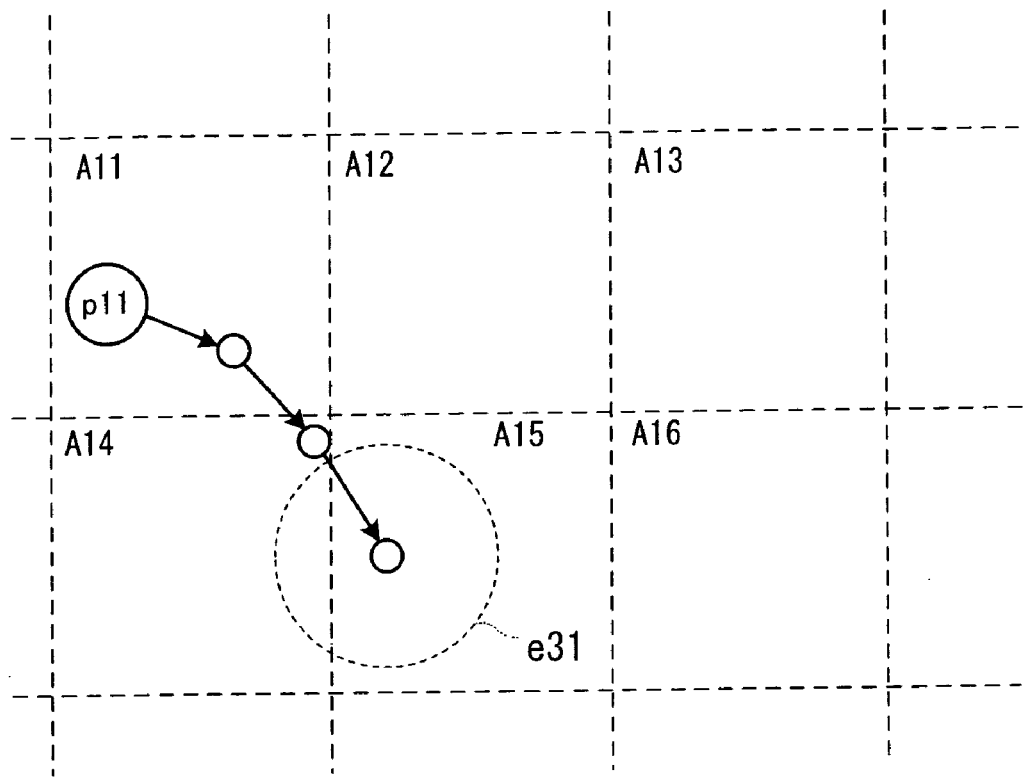
FIG. 6 is an explanatory diagram showing a third estimation function in the remote reproduction system in the first embodiment of the present invention.

FIG. 6 shows a performance example of the third function of the estimating device 14. At first, the estimating device 14 recognizes the current position of the mobile receiving apparatus 3, on the basis of the position information. For example, a point p11 in FIG. 6 represents the current position of the mobile receiving apparatus 3. Then, the estimating device 14 recognizes the movement direction and the movement velocity of the mobile receiving apparatus 3, on the basis of the movement information. When recognizing the movement direction of the mobile receiving apparatus 3, the estimating device 14 narrows down the movement direction of the mobile receiving apparatus 3, to some extent, on the basis of the transition of the current position of the mobile receiving apparatus 3 which is obtained from the GPS receiver. Moreover, the estimating device 14 detects or determines a range to which the mobile receiving apparatus 3 will likely move after a lapse of the predetermined time (hereinafter referred to as a "movement range"), on the basis of the movement direction, which is narrowed down to some extent, and the movement velocity of the mobile receiving apparatus 3 which is obtained from the movement information. A range e31 in FIG. 6 represents the movement range. Incidentally, the detection or determination of the movement range can be performed without the movement information. Namely, the detection or determination of the movement range can be performed by using only two ore more pieces of the position information which are obtained in a short time. Yet, it becomes easier to detect or determine the movement range by using the position information.

Then, the estimating device 14 examines the communication environment in the movement range, on the basis of the information materials of communication environments. As described above, the information materials of communication environments in the embodiment are data in which the ground and underground in Japan are divided into 100 meter square areas, in which the good or bad communication environment of each area is evaluated, and in which the evaluation result is recorded for each area. Each of areas A11 to A16 in FIG. 6 indicates the divided 100 meter square area, as in FIG. 4. For example, it is written in the information materials of communication environments that the communication environment in the area A11 is "good". Moreover, it is written in the information materials of communication environments that the communication environment in the area A14 is "good". Furthermore, it is written in the information materials of communication environments that the communication environment in the area A15 is "bad".

Then, the estimating device 14 examines the communication environment in an area which overlaps with the movement range, even partially. If there are a plurality of areas which overlap with the movement range, even partially, the estimating device 14 selects an area whose communication condition is the worst, from the plurality of areas, and provides the communication condition in the area as the estimation result. In FIG. 6, the areas A14 and A15 partially overlap with the estimated area e31. Then, the area whose communication condition is the worst out of the areas A14 and A15 is the area A15, and the communication environment of the area A15 is "bad", so that the estimating device 14 estimates that the communication condition after a lapse of the predetermined time between the transmitting apparatus 2 and the mobile receiving apparatus 3 is "bad".

According to the third function of the estimating device 14, it is possible to estimate the communication condition even if the mobile receiving apparatus 3 and the transmitting apparatus 2 do not have the map information which describes road positions or the like.

Estimation of Communication Condition 4

The fourth function of the estimating device 14 is to estimate the communication condition by using an information transmission terminal, such as a ubiquitous terminal. The ubiquitous terminal is located in many places in cities and towns. The ubiquitous terminal transmits information which indicates the position information or a surrounding communication condition. The estimating device 14 obtains the information transmitted from the ubiquitous terminal, and estimates the communication condition at the position of the mobile receiving apparatus 3 after a lapse of the predetermined time, on the basis of the information.

Figure 7:
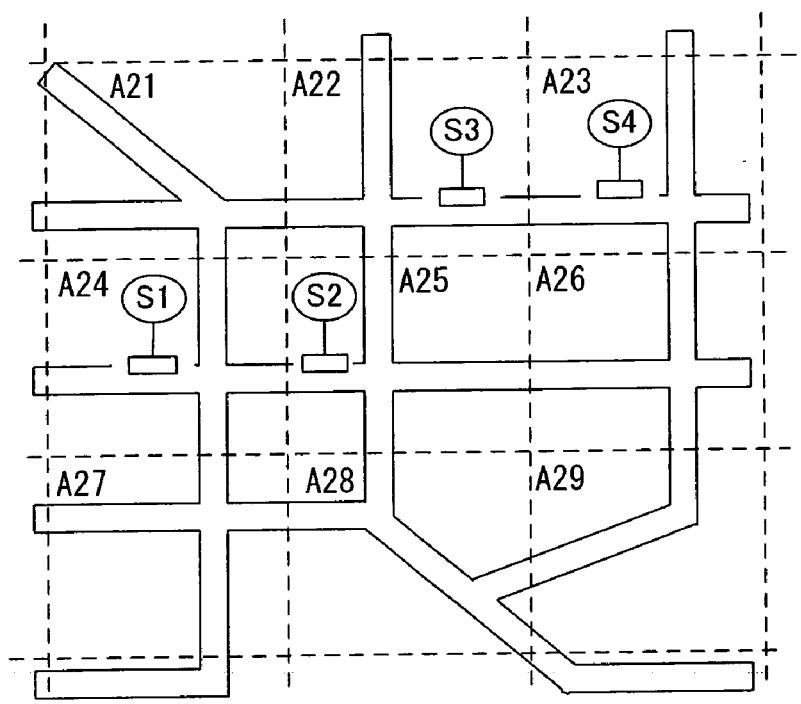
FIG. 7 is an explanatory diagram showing a fourth estimation function in the remote reproduction system in the first embodiment of the present invention.

If a user who carries the mobile receiving apparatus 3 travels by transportation, such as a train and bus, the estimating device 14 can obtain the position information and the like, from the ubiquitous terminal located at each station or each bus stop. The estimating device 14 can accurately estimate the position of the mobile receiving apparatus 3 after a lapse of the predetermined time, on the basis of the position information, and can estimate the communication condition at the position. FIG. 7 shows a case where the ubiquitous terminals are located at bus stops S1 to S4.

Change of Transmission Rate 1

The rate changing device 32 has several functions, with respect to the change of the transmission rate of the content data. For the transmission rate of the content data, a standard value (hereinafter referred to as a "rate standard value") is determined in advance. For example, the rate standard value is a reference value which allows the optimum communication between the transmitting apparatus 2 and the mobile receiving apparatus 3 if the communication condition between the transmitting apparatus 2 and the mobile receiving apparatus 3 is good.

The first function of the rate changing device 32 is as follows. Namely, the rate changing device 32 reduces the transmission rate of the content data to have a lower value than the rate standard value if the communication condition at the future position of the mobile receiving apparatus 3 is worse than that of the mobile receiving apparatus 3 at the current position. Then, the rate changing device 32 maintains the transmission rate while the mobile receiving apparatus 3 is moving on a position or in area whose communication condition is bad.

The rate changing device 32 adopts three methods, as the method of reducing the transmission rate of the content data. A first method is to reduce the transmission rate by reducing the frame rate of the content data. A second method is to reduce the transmission rate by increasing the encoding rate (i.e. data compression ratio) of the content data. A third method is to reduce the transmission rate by reducing the frame rate of the content data and by increasing the encoding rate (i.e. data compression ratio) of the content data. The rate changing device 32 selects one of the methods, as occasion demands, to reduce the transmission rate.

As described above, according to the first function of the rate changing device 32, it is possible to reduce the incidence of communication errors in the communication between the transmitting apparatus 2 and the mobile receiving apparatus 3, by making the transmission rate of the content data lower than the rate standard value, and it is possible to establish the communication that has tolerance for noise or the communication that facilitates error correction, between the both apparatuses. Therefore, it is possible realize the certain transmission and reception of the content data and the control information between the transmitting apparatus 2 and the mobile receiving apparatus 3, even in a bad communication condition.

Change of Transmission Rate 2

The second function of the rate changing device 32 is as follows. Namely, the rate changing device 32 increases the transmission rate of the content data if the communication condition at the future position of the mobile receiving apparatus 3 is better than that of the mobile receiving apparatus 3 at the current position. For example, the rate changing device 32 sets the transmission rate to the rate standard value, if the transmission rate has a lower value than the rate standard value. Then, the rate changing device 32 maintains the transmission rate while the mobile receiving apparatus 3 is moving on a position or in area whose communication condition is good.

The rate changing device 32 adopts three methods, as the method of increasing the transmission rate of the content data. A first method is to increase the transmission rate by increasing the frame rate of the content data. A second method is to increase the transmission rate by decreasing the encoding rate (i.e. data compression ratio) of the content data. A third method is to increase the transmission rate by increasing the frame rate of the content data and by decreasing the encoding rate (i.e. data compression ratio) of the content data. The rate changing device 32 selects one of the methods, as occasion demands, to increase the transmission rate.

As described above, according to the second function of the rate changing device 32, it is possible to increase the amount per unit time of the content data which is supplied to the mobile receiving apparatus 3 from the transmitting apparatus 2, by increasing the transmission rate of the content data. Therefore, if the communication condition is good, it is possible to increase the quality of music or video images which is reproduced on the mobile receiving apparatus 3.

Change of Transmission Rate 3

Although the rate changing device 32 has the above-mentioned first and second functions as the basic function, the third function described below may be added to the rate changing device 32. Namely, the rate changing device 32 increases the transmission rate of the content data before the mobile receiving apparatus 3 approaches the future position if the communication condition at the future position of the mobile receiving apparatus 3 is worse than that of the mobile receiving apparatus 3 at the current position, and sets the transmission rate to have a higher value than the rate standard value. Then, the rate changing device 32 reduces the transmission rate of the content data after the mobile receiving apparatus 3 approaches the future position and sets the transmission rate to have a lower value than the rate standard value.

Figure 8:
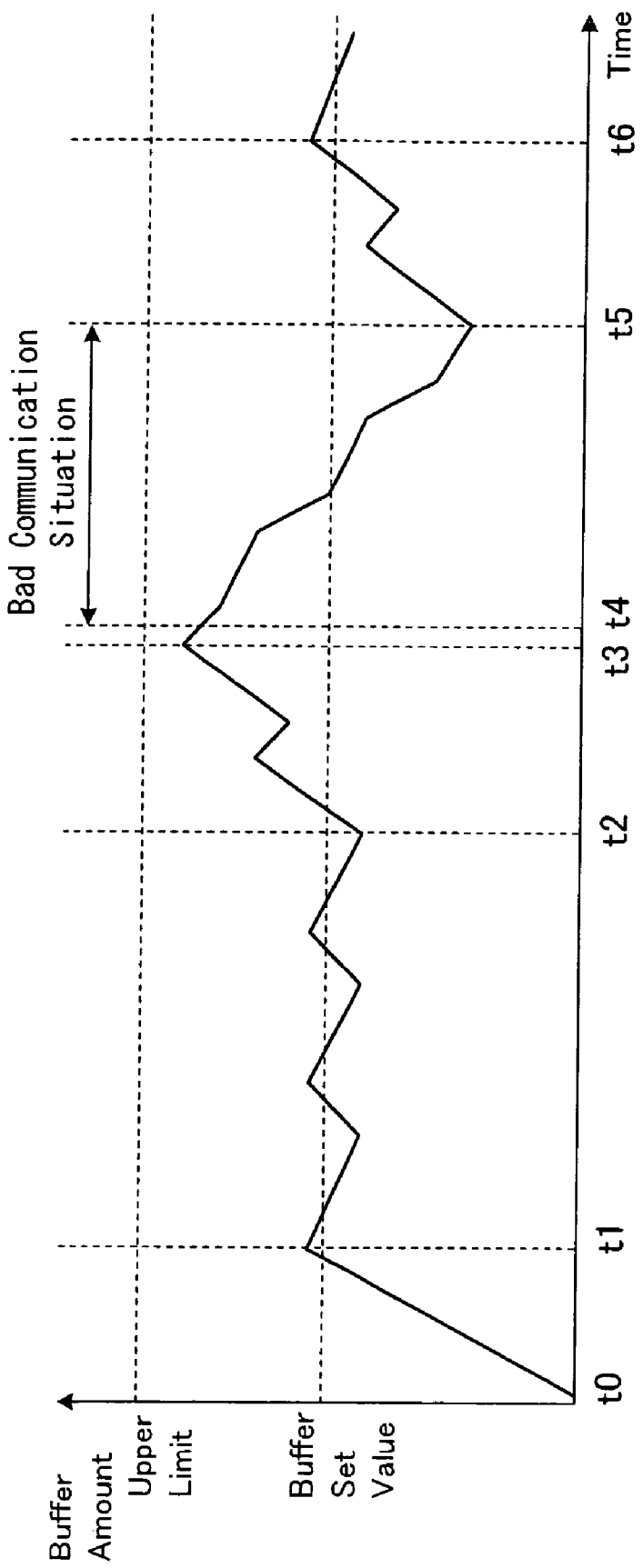
FIG. 8 is an explanatory diagram showing a third transmission rate change function in the remote reproduction system in the first embodiment of the present invention.

The detailed third function of the rate changing device 32 will be discussed with reference to FIG. 8. FIG. 8 shows a change in the buffer amount of the buffering device 17 of the mobile receiving apparatus 3. As shown in FIG. 8, the buffering device 17 has the set value of the buffer amount (hereinafter referred to as a "buffer set value") determined in advance. Incidentally, the buffer amount means the amount of data accumulated or stored in the buffering device 17. The buffer set value is a reference value which is determined on the grounds that there is no shortage of the data upon the data reproduction (consumption) and that the buffer amount does not exceed the allowed storage capacity of the buffering device 17, or the like.

At a time point t0 in FIG. 8, the transmission of the content data is started from the transmitting apparatus 2 to the mobile receiving apparatus 3. Then, the mobile receiving apparatus 3 stores the content data into the buffering device 17. By this, the buffer amount of the buffering device 17 increases. Then, if the buffer amount of the buffering device 17 slightly exceeds the buffer set value at a time point t1, the reproduction of the content data is started by the reproducing device 18. At this time, the rate changing device 32 sets the transmission rate of the content data to the rate standard value.

The reproducing device 18 consumes a part of the content data stored in the buffering device 17 in performing the reproduction process. By this, the buffer amount of the buffering device 17 decreases and slightly falls below the buffer set value. At a next moment, however, the new content data is supplied from the transmitting apparatus 2, so that the buffer amount of the buffering device 17 increases again. Namely, if viewed broadly, during the reproduction of the content data, normally, the amount per unit time of the content data which is supplied from the transmitting apparatus 2 is substantially equal to the amount per unit time of the content data which is consumed in the reproduction process. Thus, the buffer amount of the buffering device 17 is maintained between a slightly larger value than the buffer set value and a slightly smaller value than the buffer set value.

Then, at a time point t2, the mobile receiving apparatus 3 estimates that the communication condition at the future position is bad, and transmits, to the transmitting apparatus 2, a command (control information) to increase the transmission rate of the content data, for example. In accordance with this, the rate changing device 32 of the transmitting apparatus 2 increases the transmission rate, and sets it to have a higher value than the rate standard value. Specifically, the rate changing device 32 increases the transmission rate by changing the transmission rule (e.g. the number of transmission packets per unit time) of the data transmitting device 33 while maintaining the frame rate of the content data and the encoding rate (i.e. data compression ratio) of the content data.

The point to notice is that the increase of the transmission rate at the time point t2 has a different character from the increase of the transmission rate in the second function of the rate changing device 32 described above. In the second function of the rate changing device 32, the rate changing device 32 increase the transmission rate by increasing the frame rate or reducing the encoding rate of the content data. Even if the transmission rate is increased in this method (in the second function), there is no change in the time length (reproduction time length) of the music or video images which is reproduced with the content data supplied per unit. Only the quality of the music or video images to be reproduced becomes good. As opposed to this, at the time point p2 in FIG. 8, the rate changing device 32 increases the transmission rate while maintaining the frame rate and encoding rate of the content data. If the transmission rate is increased in this method (in the third function), there is an increase in the time length (reproduction time length) of the music or video images which is reproduced with the content data supplied per unit. Incidentally, in this method, there is no change in the quality of the music or video images to be reproduced.

If the rate changing device 32 increases the transmission rate at the time point t2, the amount per unit time of the content data which is supplied from the transmitting apparatus 2 increases. Then, if viewed broadly, the supply per unit time of the content data becomes larger than the consumption per unit time of the content data. Thus, the buffer amount of the buffering device 17 greatly increases, beyond the buffer set value. Then, the rate changing device 32 maintains the transmission rate with this high value, between the time point t2 and a time point t3, i.e., until the mobile receiving apparatus 3 approaches a position or area (future position) whose communication condition is bad.

Then, at the time point t3 in FIG. 8, the mobile receiving apparatus 3 approaches the position or area (future position) whose communication condition is bad. The mobile receiving apparatus 3 recognizes the fact by using the position detecting device 11 or the like, for example, and transmits a command to the transmitting apparatus 2 by using the control information transmitting device 15. In accordance with this, the rate changing device 32 reduces the transmission rate of the content data, and sets it to have a lower value than the rate standard value. Then, the rate changing device 32 maintains the transmission rate with the lower value, between a time point t4 and a time point t5, i.e., while the mobile receiving apparatus 3 is moving on the position or area (future position) whose communication condition is bad. Incidentally, a time length from when the mobile receiving apparatus 3 approaches the position or area (future position) whose communication condition is bad to when the mobile receiving apparatus 3 reaches the position or area (future position) whose communication condition is bad; namely, a time length from the time point t3 to the time point t4 is one second, for example.

The rate changing device 32 reduces the transmission rate of the content data in the following method at the time point t3. Namely, the rate changing device 32 reduces the transmission rate by changing the transmission rule of the data transmitting device 33, and simultaneously, reduces the frame rate. Alternatively, it reduces the transmission rate by changing the transmission rule of the data transmitting device 33, and simultaneously, increases the encoding rate. Alternatively, it reduces the transmission rate by changing the transmission rule of the data transmitting device 33, and simultaneously, reduces the frame rate and increases the encoding rate.

As described above, according to the third function of the rate changing device 32, it is possible to increase the buffer amount of the buffering device 17 (the time points t2 to t3) from the buffer amount upon the normal reproduction (the time points t1 to t2), by increasing the transmission rate of the content data before the mobile receiving apparatus 3 approaches a position or area (future position) whose communication condition is bad. By this, it is possible to store the content data which is required for the reproduction of prolonged music or video images, into the buffering device 17. Therefore, even if the mobile receiving apparatus 3 reaches the position or area whose communication condition is very bad so that the communication between the transmitting apparatus 2 and the mobile receiving apparatus 3 is difficult for a while, it is possible to maintain the stable reproduction of music or video images for a long time, by using the content data stored in the buffering device 17.

Moreover, according to the third function of the rate changing device 32, it is possible to reduce the incidence of communication errors in the communication between the transmitting apparatus 2 and the mobile receiving apparatus 3, by making the transmission rate of the content data lower than the rate standard value after the mobile receiving apparatus 3 approaches the position or area (future position) whose communication condition is bad, and it is possible to establish the communication that has tolerance for noise or the communication that facilitates error correction, between the both apparatuses. Therefore, it is possible realize the certain transmission and reception of the content data and the control information between the transmitting apparatus 2 and the mobile receiving apparatus 3, even in a bad communication condition.

Moreover, according to the third function of the rate changing device 32, it is possible to complete the change of the transfer rate before the communication condition becomes bad, by starting the operation of reducing the transmission rate of the content data, when the mobile receiving apparatus 3 approaches the position or area (future position) whose communication condition is bad (i.e. at the time point t3, i.e. before reaching the position or area). (Note that the mobile receiving apparatus 3 approaches the position or area at time point t3, and then, reaches the position or area at time point t4.) Therefore, it is possible to realize the certain communication between the transmitting apparatus 2 and the mobile receiving apparatus 3, immediately after the mobile receiving apparatus 3 reaches the position or area whose communication condition is bad.

Incidentally, it is also possible to simultaneously carry out increasing of the transmission rate by changing the transmission rule and reducing of the frame rate between the time point t2 and the time point t3. Moreover, it is also possible to simultaneously carry out increasing of the transmission rate by changing the transmission rule and increasing of the encoding rate (data compression ratio) between the time point t2 and the time point t3. Moreover, it is also possible to simultaneously carry out increasing of the transmission rate by changing the transmission rule, reducing of the frame rate, and increasing of the encoding rate between the time point t2 and the time point t3. By this, it is possible to store the content data which is required for the reproduction of further prolonged music or video images, into the buffering device 17, before the mobile receiving apparatus 3 approaches the position or area (future position) whose communication condition is bad.

Moreover, it is also possible to reduce the frame rate while maintaining the transmission rate with the rate standard value between the time point t2 and the time point t3. Moreover, it is also possible to increase the encoding rate (data compression ratio) while maintaining the transmission rate with the rate standard value in the same period. Moreover, it is also possible to reduce the frame rate and increase the encoding rate while maintaining the transmission rate with the rate standard value in the same period. Even by this type of construction, it is possible to store the content data which is required for the reproduction of prolonged music or video images, into the buffering device 17, before the mobile receiving apparatus 3 approaches the position or area (future position) whose communication condition is bad.

Change of Transmission Rate 4

Moreover, the fourth function described below may be added to the first, second, and third functions of the rate changing device 32. Namely, the rate changing device 32 increases the transmission rate of the content data from the rate standard value if the communication condition at the future position of the mobile receiving apparatus 3 is better than that at the current position of the mobile receiving apparatus 3, and maintains the increased transmission rate until the amount of the content data stored in the buffering device 17 (i.e. the buffer amount) reaches a predetermined amount suitable for the reproduction of the content data (i.e. the buffer set value or a slightly larger amount than this).

Using FIG. 8 again, the detailed function of the rate changing device 32 will be discussed. At the time point t5, the mobile receiving apparatus 3 reaches a position or area whose communication condition is good. The mobile receiving apparatus 3 recognizes the fact by using the position detecting device 11 or the like, for example, and transmits a command to the transmitting apparatus 2 by using the control information transmitting device 15. In accordance with this, the rate changing device 32 increases the transmission rate of the content data, and sets it to have a higher value than the rate standard value.

The rate changing device 32 increases the transmission rate in the following method at the time point t5. Namely, the rate changing device 32 increases the transmission rate by changing the transmission rule of the data transmitting device 33, and simultaneously, increases the frame rate. Alternatively, it increases the transmission rate by changing the transmission rule of the data transmitting device 33, and simultaneously, reduces the encoding rate. Alternatively, it increases the transmission rate by changing the transmission rule of the data transmitting device 33, and simultaneously, increases the frame rate and reduces the encoding rate. Then, the rate changing device 32 maintains the transmission rate with the high value between the time point t5 and a time point t6.

If the rate changing device 32 increases the transmission rate of the content data at the time point t5, the amount per unit time of the content data which is supplied from the transmitting apparatus 2 increases. If viewed broadly, the supply per unit time of the content data becomes larger than the consumption per unit time of the content data. Thus, the buffer amount of the buffering device 17 greatly increases in a short time. As a result, the buffer amount exceeds the buffer set value in a short time.

At the time point t6, the buffer amount of the buffering device 17 has a slightly larger value than the buffer set value. The mobile receiving apparatus 3 recognizes the fact, and transmits a command to the transmitting apparatus 2 by using the control information transmitting device 15. In accordance with this, the rate changing device 32 reduces the transmission rate of the content data, and sets it to the rate standard value. Namely, it returns the transmission rule of the data transmitting device 33, the frame rate, and the encoding rate to the values upon the normal reproduction.

As described above, according to the fourth function of the rate changing device 32, it is possible to increase the buffer amount of the buffering device 17 to the buffer set value or a slightly larger amount than this in a short time, by increasing the transmission rate of the content data form the rate standard value after the mobile receiving apparatus 3 reaches the position or area whose communication condition is good. Therefore, even if the buffer amount of the buffering device 17 is reduced because the mobile receiving apparatus 3 moves on the position or in the area whose communication condition is bad and the buffer amount greatly falls below the buffer set value, it is possible to recover the buffer amount in a short time to the buffer set value or a larger value. Thus, it is possible to quickly recover the normal reproduction after the mobile receiving apparatus 3 moved on the position or in the area whose communication condition is bad.

Incidentally, it is also possible to reduce the frame rate, as well as increasing the transmission rate, between the time point t5 and the time point t6. Moreover, it is also possible to increase the encoding rate, as well as increasing the transmission rate, in the same period. Moreover, it is also possible to reduce the frame rate and increase the encoding rate, as well as increasing the transmission rate, in the same period. By this, it is possible to recover the normal reproduction, more quickly.

Stop Transmission

Figure 9:
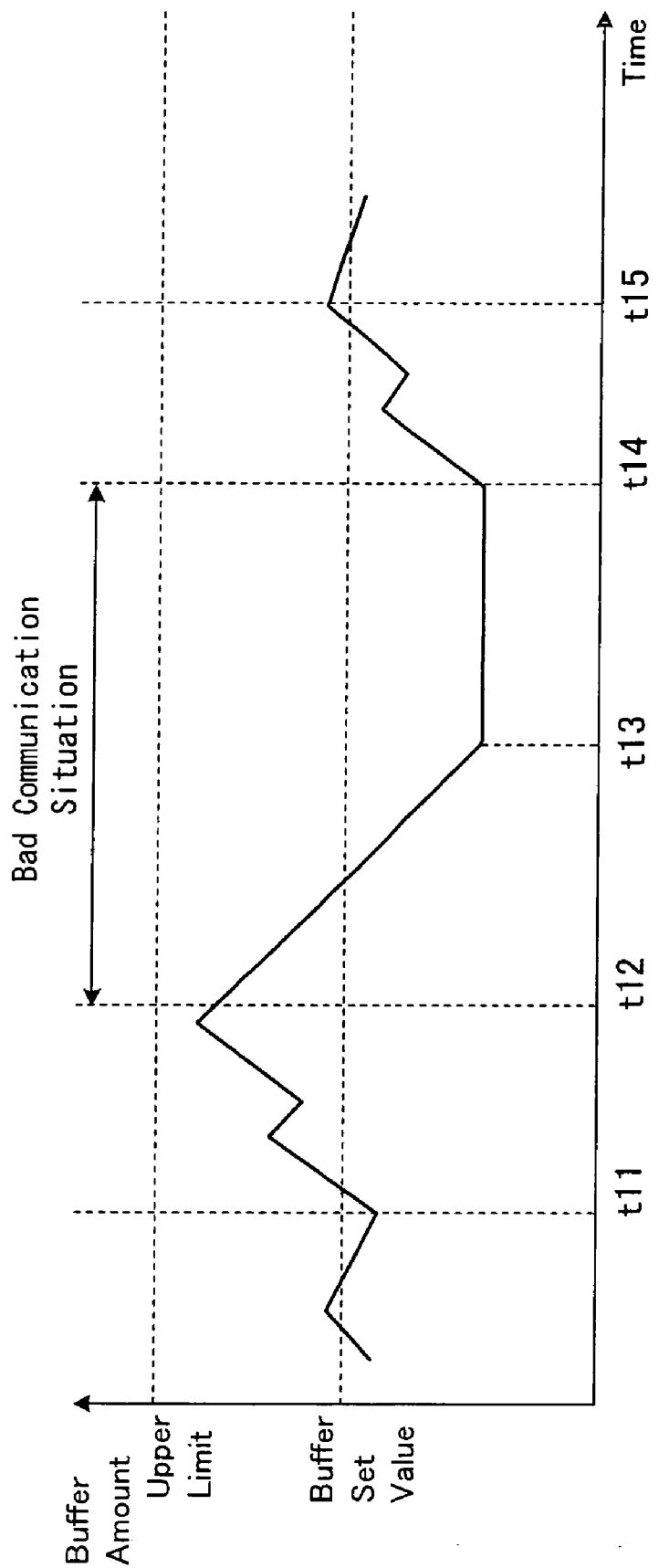
FIG. 9 is an explanatory diagram showing a fourth transmission rate change function in the remote reproduction system in the first embodiment of the present invention.

As described above, the transmission stopping device 36, which is an additional constitutional element of the transmitting apparatus 2, temporarily stops the transmission of the content data performed by the data transmitting device 33, in accordance with the communication condition estimated by the estimating device 14. The detailed function of the transmission stopping device 36 will be discussed with reference to FIG. 9. FIG. 9 shows a change in the buffer amount of the buffering device 17 of the mobile receiving apparatus 3, as in FIG. 8.

In FIG. 9, the transmission of the content data has been already performed from the transmitting apparatus 2 to the mobile receiving apparatus 3. The reproduction of the content data has been also performed by the reproducing device 18 of the mobile receiving apparatus 3. Therefore, the buffer amount of the buffering device 17 is maintained between a slightly larger value than the buffer set value and a slightly smaller value than the buffer set value.

Then, at a time point t11, the mobile receiving apparatus 3 estimates that the communication condition at the future position is bad, and transmits, to the transmitting apparatus 2, a command (control information) to increase the transmission rate of the content data, for example. In accordance with this, the rate changing device 32 of the transmitting apparatus 2 increases the transmission rate of the content data, and sets it to have a higher value than the rate standard value. Specifically, the rate changing device 32 increases the transmission rate by changing the transmission rule of the data transmitting device 33 while maintaining the frame rate of the content data and the encoding rate (i.e. data compression ratio) of the content data. By this, the amount per unit time of the content data which is supplied from the transmitting apparatus 2 increases. Then, if viewed broadly, the supply per unit time of the content data becomes larger than the consumption per unit time of the content data. Thus, the buffer amount of the buffering device 17 greatly increases, beyond the buffer set value. Then, the rate changing device 32 maintains the transmission rate with this high value, between the time point t11 and a time point t12, i.e., until the mobile receiving apparatus 3 reaches a position or area (future position) whose communication condition is bad.

Then, at the time point t12, the mobile receiving apparatus 3 reaches a position or area (future position) whose communication condition is bad. The mobile receiving apparatus 3 recognizes the fact by using the position detecting device 11 or the like, for example, and transmits a command to the transmitting apparatus 2 by using the control information transmitting device 15. In accordance with this, the transmission stopping device 36 stops the transmission of the content data performed by the data transmitting device 33. Then, the transmission stopping device 36 maintains the transmission stopped condition, between the time point t12 and a time point t14, i.e. while the mobile receiving apparatus 3 is moving on the position or area (future position) whose communication condition is bad.

Even if the transmission of the content data is stopped at the time point t12, the reproduction of the content data is continued by the reproducing device 18 while the content data much enough for the reproduction process is stored in the buffering device 17. However, the content data is consumed for the reproduction process, and if there is no more content data enough for the reproduction process in the buffering device 17, the reproduction of the content data by the reproducing device 18 is stopped. A period between a time point t13 and a time point t14 in FIG. 9 corresponds to the period in which the reproduction of the content data is stopped.

Then, at the time point t14, the mobile receiving apparatus 3 reaches a position or area whose communication condition is good. The mobile receiving apparatus 3 recognizes the fact by using the position detecting device 11 or the like, for example, and transmits a command to the transmitting apparatus 2 by using the control information transmitting device 15. In accordance with this, the transmission stopping device 36 restarts the transmission of the content data performed by the data transmitting device 33. At the same time, the rate changing device 32 sets the transmission rate of the content data to have a higher value than the rate standard value.

The rate changing device 32 increases the transmission rate in the following method at the time point t14. Namely, the rate changing device 32 increases the transmission rate by changing the transmission rule of the data transmitting device 33, and simultaneously, increases the frame rate. Alternatively, it increases the transmission rate by changing the transmission rule of the data transmitting device 33, and simultaneously, reduces the encoding rate. Alternatively, it increases the transmission rate by changing the transmission rule of the data transmitting device 33, and simultaneously, increases the frame rate and reduces the encoding rate. Then, the rate changing device 32 maintains the transmission rate with the high value between the time point t14 and a time point t15.

At the time point t15, the buffer amount of the buffering device 17 has a slightly larger value than the buffer set value. The mobile receiving apparatus 3 recognizes the fact, and transmits a command to the transmitting apparatus 2 by using the control information transmitting device 15. In accordance with this, the rate changing device 32 reduces the transmission rate of the content data, and sets it to the rate standard value. Namely, it returns the transmission rule of the data transmitting device 33, the frame rate, and the encoding rate to the values upon the normal reproduction. Then, the reproducing device 18 restarts the reproduction of the content data.

As described above, according to the transmission stopping device 36, it temporarily stops the transmission of the content data performed by the data transmitting device 33 when the mobile receiving apparatus 3 reaches the position or area whose communication condition is bad. By this, it is possible to prevent that the deteriorating communication condition causes the content data to be partially not-reproducible to thereby lose a part of the content of contents, such as music and movies. It is also possible to maintain the continuity of the content of contents. Namely, generally, in the streaming reproduction, the content data which is transmitted from the transmitting apparatus to the receiving apparatus is updated one after another with the passage of time. The receiving apparatus cannot require the transmitting apparatus to transmit again the content data which was transmitted once in the past, while continuing the present reproduction. Therefore, the following disadvantageous situations likely occur in the conventional remote reproduction system.

For example, it is assumed that during the streaming reproduction, the communication between the transmitting apparatus and the receiving apparatus cannot be made for a long time due to the deteriorating communication condition. In this not-communicable period, if the transmitting apparatus continues the transmission of the content data, the content data is updated one after another, although the receiving apparatus does not receive the content data. Thus, the receiving apparatus loses a way to obtain the content data which is transmitted in the not-communicable period while maintaining the present reproduction. As a result, the receiving apparatus cannot reproduce a part of the content data, and the contents of the music or video images are lost partially. As a result, the user needs to listen to music or watch video images with the discontinuous content.

As opposed to this, in the remote reproduction system 1 in the embodiment, if the communication condition is deteriorated, the transmission stopping device 36 of the transmitting apparatus 2 stops the transmission of the content data. Then, when the communication condition is recovered, the transmission stopping device 36 restarts the transmission of the content data. By this, while the communication condition is deteriorated, the content data is not updated. Therefore, the mobile receiving apparatus 3 can reproduce all the content data, and reproduce the entire contents of music or video images. Thus, the user can listen to or watch video images with the continuous content.

Incidentally, it is true that if the not-communicable period is long, as shown in FIG. 9, the reproduction of the content data is temporarily stopped, so that the continuity in time of the reproduction of music or video images is lost. However, the transmission is stopped in the not-communicable period and the updating the content data is stopped, so that the continuity in the contents of music or video images is not lost.

As described above, according to the remote reproduction system 1 in the first embodiment of the present invention, it is provided with: the estimating device 14 for estimating the communication condition between the transmitting apparatus 2 and the mobile receiving apparatus 3 at the future position of the mobile receiving apparatus 3 in motion; and the rate changing device 32 for changing the transmission rate of the content data in accordance with the communication condition estimated by the estimating device 14. Thus, it is possible to recognize the deteriorating communication condition in advance, and change the transmission rate of the content data in accordance with the recognition. By this, it is possible to reduce the incidence of errors even in the deteriorating communication condition, and it is also possible to maintain the transmission of the content data from the transmitting apparatus 2 to the mobile receiving apparatus 3. Therefore, it is possible to stabilize the reproduction of the content data on the mobile receiving apparatus 3.

Moreover, as the additional constitutional element of the transmitting apparatus 2 in the remote reproduction system 1, it is provided with the transmission stopping device 36 for temporarily stopping the transmission of the content data performed by the data transmitting device 33, in accordance with the communication condition estimated by the estimating device 14. Thus, for example, when the communication condition is remarkably bad, it is possible to stop the updating the content data by stopping the communication of the content data from the transmitting apparatus 2 to the mobile receiving apparatus 3. By this, it is possible to lose the content of contents, such as music or video images, to thereby maintain the continuity of the content of the contents, such as music or video images.

Second Embodiment of Remote Reproduction System

The second embodiment of the remote reproduction system of the present invention will be discussed. In the first embodiment of the remote reproduction system described above, the mobile receiving apparatus estimates the communication condition between the transmitting apparatus and the mobile receiving apparatus at the future position of the mobile receiving apparatus. As opposed to this, the transmitting apparatus performs this estimation in the second embodiment of the remote reproduction system described below.

Figure 10:
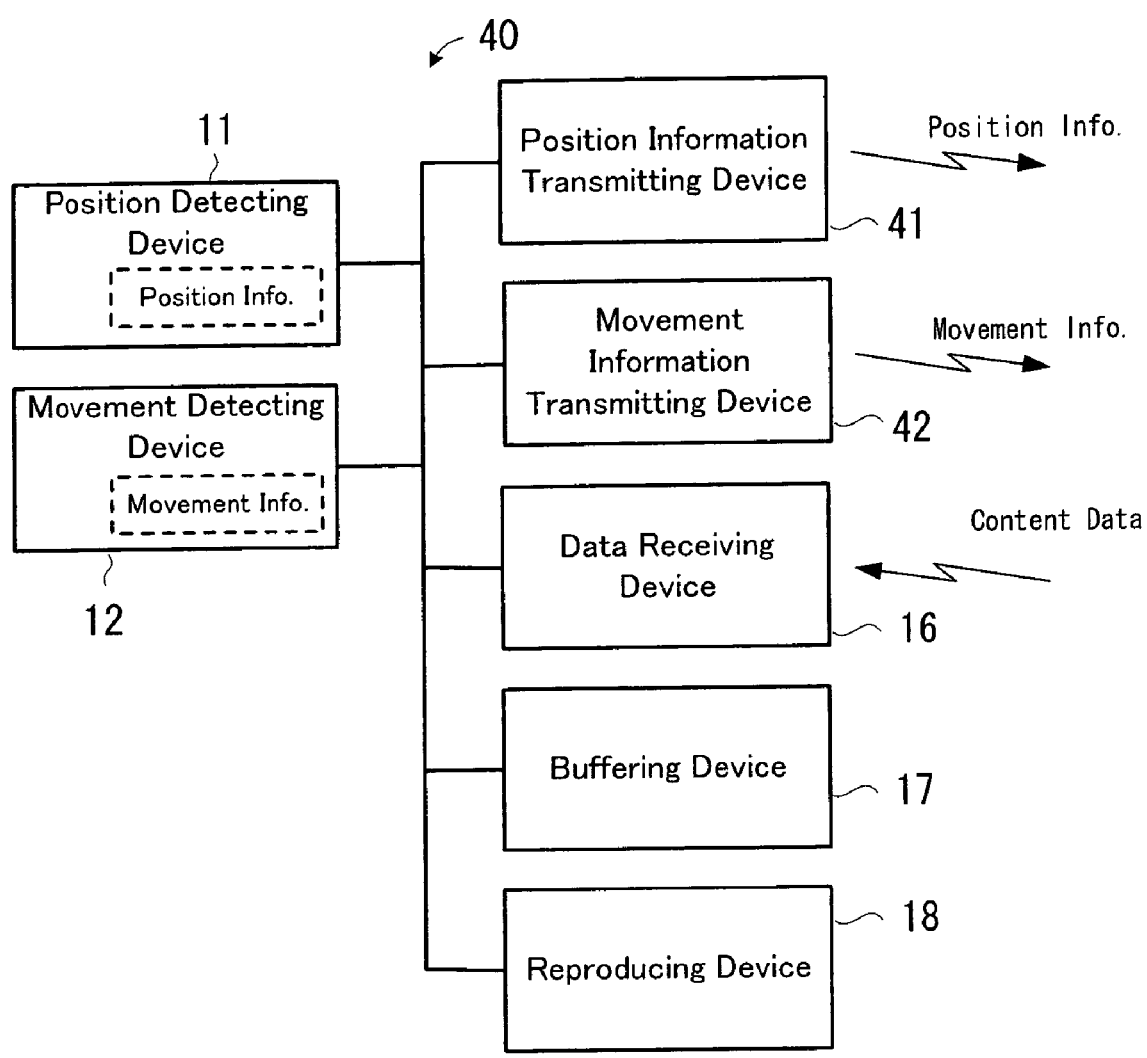
FIG. 10 is a block diagram showing a mobile receiving apparatus in the remote reproduction system in a second embodiment of the present invention.

FIG. 10 shows a mobile receiving apparatus in the remote reproduction system in the second embodiment of the present invention. As shown in FIG. 10, a mobile receiving apparatus 40 is provided with: the position detecting device 11 for detecting the current position of the mobile receiving apparatus 40 and for providing the position information which indicates the current position; the movement detecting device 12 for detecting the movement of the mobile receiving apparatus 40 and for providing the movement information which indicates the movement; a position information transmitting device 41 for transmitting the position information to a transmitting apparatus 50; a movement information transmitting device 42 for transmitting the movement information to the transmitting apparatus 50; the data receiving device 16 for receiving the content data from the transmitting apparatus 50; the buffering device 17 for temporarily accumulating or storing the content data received by the data receiving device 16; and the reproducing device 18 for reproducing the content data accumulated or stored in the buffering device 17.

Each of the position information transmitting device 41 and the movement information transmitting device 42 is a wireless transmitter, for example. The other constitutional elements of the mobile receiving apparatus 40 are substantially the same as those of the remote reproduction system in the first embodiment.

Figure 11:
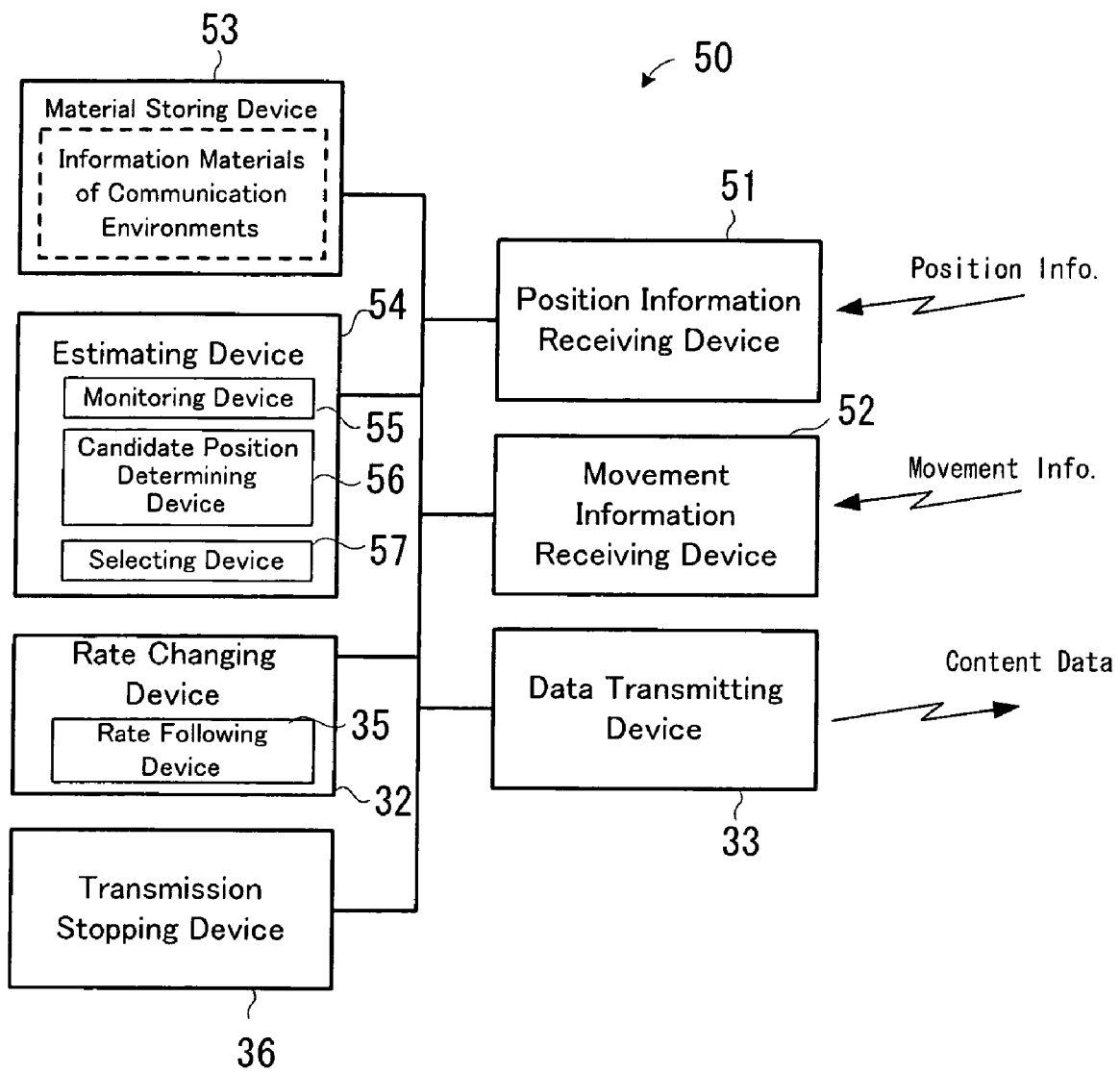
FIG. 11 is a block diagram showing a transmitting apparatus in the remote reproduction system in the second embodiment of the present invention.

FIG. 11 shows the transmitting apparatus in the remote reproduction system in the second embodiment of the present invention. As shown in FIG. 11, the transmitting apparatus 50 is provided with: a position information receiving device 51 for receiving the position information from the mobile receiving apparatus 40; a movement information receiving device 52 for receiving the movement information from the mobile receiving apparatus 40; a material storing device 53 for storing information materials of communication environments which indicate communication environments at a plurality of positions on earth; an estimating device 54 for estimating the communication condition between the transmitting apparatus 50 and the mobile receiving apparatus 40 at the future position of the mobile receiving apparatus 40 in motion, on the basis of the position information, the movement information, and the information materials of communication environments; the rate changing device 32 for changing the transmission rate in accordance with the communication condition estimated by the estimating device 54; and the data transmitting device 33 for transmitting the content data to the mobile receiving apparatus 40 in accordance with the transmission rate changed by the rate changing device 32.

The position information receiving device 51 and the movement information receiving device 52 are wireless or wired receivers, for example, and the detailed structures thereof are substantially the same as that of the control information receiving device in the remote reproduction system in the first embodiment. Moreover, the material storing device 53 and the information materials of communication environments stored therein are substantially the same as those in the remote reproduction system in the first embodiment. Moreover, the estimating device 54 is substantially the same as the estimating device in the remote reproduction system in the first embodiment. Moreover, the estimating device 54 is provided with: a monitoring device 55; a candidate position determining device 56; and a selecting device 57. These devices are substantially the same as the monitoring device, the candidate position determining device, and the selecting device in the remote reproduction system in the first embodiment.

Incidentally, if the mobile receiving apparatus 40 is a mobile terminal of a portable type, such as a mobile phone, a PDA, and a mobile personal computer, it is possible to estimate the movement direction and the movement velocity of the mobile receiving apparatus 40, from two or more pieces of the position information which are obtained in a short time by the GPS positioning method. In this case, the movement detecting device 12, the movement information transmitting device 42, and the movement information receiving device 52 are not necessarily required, so that the devices can be removed.

The remote reproduction system having the above structure in the second embodiment of the present invention operates as follows. If the mobile receiving apparatus 40 is a mobile phone, a PDA, or a mobile personal computer, for example, a user carries the mobile receiving apparatus 40 and walks or travels by bicycle, car, or train. Alternatively, if the mobile receiving apparatus 40 is a car navigation system, for example, the user travels in a car equipped with the mobile receiving apparatus 40. In such a situation, if the user inputs an instruction to start the reproduction of music or movies, to the mobile receiving apparatus 40, communication is started between the transmitting apparatus 50 and the mobile receiving apparatus 40. At first, the data transmitting deice 33 of the transmitting apparatus 50 transmits the content data to the mobile receiving apparatus 40. At this time, if the communication condition is good between the transmitting apparatus 50 and the mobile receiving apparatus 40, the rate changing device 32 sets the transmission rate of the content data to the rate standard value. By this, the content data is transmitted at the transmission rate with the standard value. The data receiving device 16 of the mobile receiving apparatus 40 receives the content data from the data transmitting deice 33, and stores this data in the buffering device 17. When the amount of the content data stored in the buffering device 17 slightly exceeds the buffer set value, the reproducing device 18 reads the content data stored in the buffering device 17, and starts the reproduction of the content data.

During the reproduction of the content data, the position detecting device 11 sequentially detects the position of the mobile receiving apparatus 40 in motion, and sequentially updates the position information. The movement detecting device 12 sequentially detects the movement of the mobile receiving apparatus 40, and sequentially updates the movement information. The position information transmitting device 41 and the movement information transmitting device 42 sequentially transmit the position information and the movement information, respectively, to the transmitting apparatus 50.

In the transmitting apparatus 50, the position information receiving device 51 and the movement information receiving device 52 receive the position information and the movement information, respectively, from the mobile receiving apparatus 40. In the transmitting apparatus 50, the estimating device 54 obtains the position information and the movement information, and refers to the information materials of communication environments stored in the material storing device 53, to thereby sequentially estimate the communication condition at the future position of the mobile receiving apparatus 40.

The rate changing device 32 changes the transmission rate of the content data on the basis of the estimation result of the estimating device 54. Since the estimation result of the estimating device 54 is sequentially updated, the rate changing device 32 changes the transmission rate of the content data every time the estimation result is updated. Basically, the rate changing device 32 reduces the transmission rate of the content data to have a lower value than the rate standard value if the estimating device 54 estimates that the communication condition at the future position of the mobile receiving apparatus 40 is bad (first function). By this, when the communication condition at the future position of the mobile receiving apparatus 40 is bad, the amount per unit time of the content data which is transmitted from the data transmitting device 33 to the data receiving device 16 becomes small. On the other hand, the rate changing device 32 increases the transmission rate of the content data to the rate standard value if the estimating device 54 estimates that the communication condition at the future position of the mobile receiving apparatus 40 is good (second function). By this, when the communication condition at the future position of the mobile receiving apparatus 40 is good, the amount per unit time of the content data which is transmitted from the data transmitting device 33 to the data receiving device 16 becomes large.

On the other hand, for example, if the estimating device 54 estimates that the communication condition at the future position of the mobile receiving apparatus 40 is very bad, the transmission stopping device 36 stops the transmission of the content data performed by the data transmitting device 33. After that, if the communication condition becomes good, the transmission stopping device 36 restarts the transmission of the content data performed by the data transmitting device 33.

Even in the remote reproduction system in the second embodiment described above, as in the first embodiment, it is possible to reduce the incidence of errors even in the deteriorating communication condition, and it is also possible to maintain the transmission of the content data from the transmitting apparatus 50 to the mobile receiving apparatus 40. Therefore, it is possible to stabilize the reproduction of the content data on the mobile receiving apparatus 40.

Moreover, it is possible to prevent from losing the content of contents, such as music or video images, to thereby maintain the continuity of the content of the contents, such as music or video images.

Embodiment of Remote Reproduction Method

The embodiment of the remote reproduction method of the present invention will be discussed. The remote reproduction method in the embodiment of the present invention is a remote reproduction method of making communication between a transmitting apparatus and a mobile receiving apparatus, which are wirelessly connected to each other, of transmitting content data from the transmitting apparatus to the mobile receiving apparatus, and of reproducing the content data on the mobile receiving apparatus. The mobile receiving method is provided with: a position detecting process of detecting a current position of the mobile receiving apparatus; a movement detecting process of detecting movement of the mobile receiving apparatus; an estimating process of estimating a communication condition between the transmitting apparatus and the mobile receiving apparatus at a future position of the mobile receiving apparatus in motion, on the basis of the current position of the mobile receiving apparatus which is detected in the position detecting process, the movement of the mobile receiving apparatus which is detected in the movement detecting process, and the information materials of communication environments indicating communication environments at a plurality of positions on earth, which are stored in advance; a rate changing process of changing the transmission rate, in accordance with the communication condition estimated in the estimating device; and a data transmitting process of transmitting the content data from the transmitting apparatus to the mobile receiving apparatus, in accordance with the transmission rate changed in the rate changing process.

In the movement detecting process, it is preferable to detect the movement direction or the movement velocity of the mobile receiving apparatus. Moreover, the detection of the movement direction or the movement velocity of the mobile receiving apparatus in the movement detecting process can be performed in a measurement process by using an acceleration sensor, an angular velocity sensor, or the like. Moreover, instead of this, the detection of the movement direction or the movement velocity of the mobile receiving apparatus in the movement detecting process can be performed in an operation or calculation process based on the information about the positions of the mobile receiving apparatus, which is obtained in the position detecting process.

According to the remote reproduction method provided with the above construction, it is possible to recognize the deteriorating communication condition in advance in the estimating process, and change the transmission rate of the content data in accordance with the recognition. By this, it is possible to reduce the incidence of errors even in the deteriorating communication condition, and it is also possible to maintain the transmission of the content data from the transmitting apparatus to the mobile receiving apparatus. Therefore, it is possible to stabilize the reproduction of the content data on the mobile receiving apparatus.

Embodiment of Computer Program Product

The embodiment of the computer program product of the present invention will be discussed. The computer program product in the embodiment of the present invention is a computer program product in a computer-readable medium for realizing a remote reproduction method of transmitting content data from a first computer to a second computer and of reproducing the content data on the second computer, in a computer system provided with the first computer and the second computer, which are wirelessly connected to each other and which can mutually make communication. The remote reproduction method is provided with: a position detecting process of detecting a current position of the second computer; a movement detecting process of detecting movement of the second computer; an estimating process of estimating a communication condition between the first computer and the second at a future position of the second computer in motion, on the basis of the current position of the second computer which is detected in the position detecting process, the movement of the second computer which is detected in the movement detecting process, and the information materials of communication environments indicating communication environments at a plurality of positions on earth, which are stored in advance; a rate changing process of changing the transmission rate, in accordance with the communication condition estimated in the estimating device; and a data transmitting process of transmitting the content data from the first computer to the second computer, in accordance with the transmission rate changed in the rate changing process.

In the movement detecting process, it is preferable to detect the movement direction or the movement velocity of the second computer. Moreover, the detection of the movement direction or the movement velocity of the second computer in the movement detecting process can be performed in a measurement process by using an acceleration sensor, an angular velocity sensor, or the like. Moreover, instead of this, the detection of the movement direction or the movement velocity of the second computer in the movement detecting process can be performed in an operation or calculation process based on the information about the positions of the second computer, which is obtained in the position detecting process.

According to the computer program product provided with the above construction, it is possible to recognize the deteriorating communication condition in advance in the estimating process, and change the transmission rate of the content data in accordance with the recognition. By this, it is possible to reduce the incidence of errors even in the deteriorating communication condition, and it is also possible to maintain the transmission of the content data from the first computer to the second computer. Therefore, it is possible to stabilize the reproduction of the content data on the second computer.

EXAMPLES

Hereinafter, the example of the present invention will be discussed. In the example below, the present invention is applied to a remote reproduction system provided with a DVD recorder and a car navigation apparatus, which is one preferable example to implement the present invention.

Figure 12:
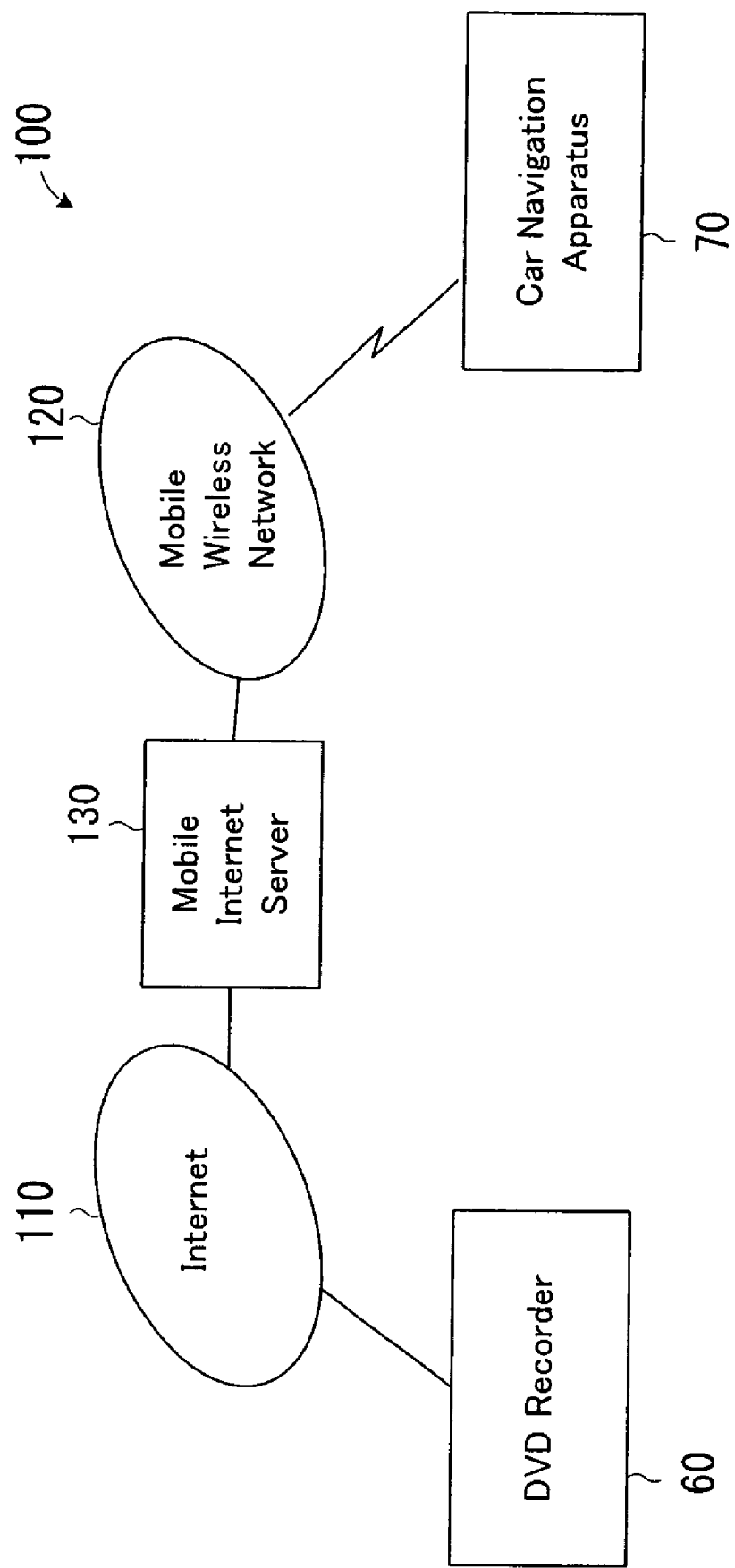
FIG. 12 is a block diagram showing an example of the remote reproduction system of the present invention.

FIG. 12 shows an example of the remote reproduction system of the present invention. As shown in FIG. 12, a remote reproduction system 100 in the example of the present invention is provided with: a DVD recorder 60; and a car navigation apparatus 70. The DVD recorder 60 and the car navigation apparatus 70 are connected through a communication line formed of an Internet 110, a mobile wireless network 120, and a mobile Internet server 130. Specifically, the DVD recorder 60 is connected to the Internet 110 through a fixed phone line (wired line). The Internet 110 is connected to the mobile wireless network 120 through the mobile Internet server 130. The car navigation apparatus 70 is wirelessly connected to the mobile wireless network 120.

Figure 13:
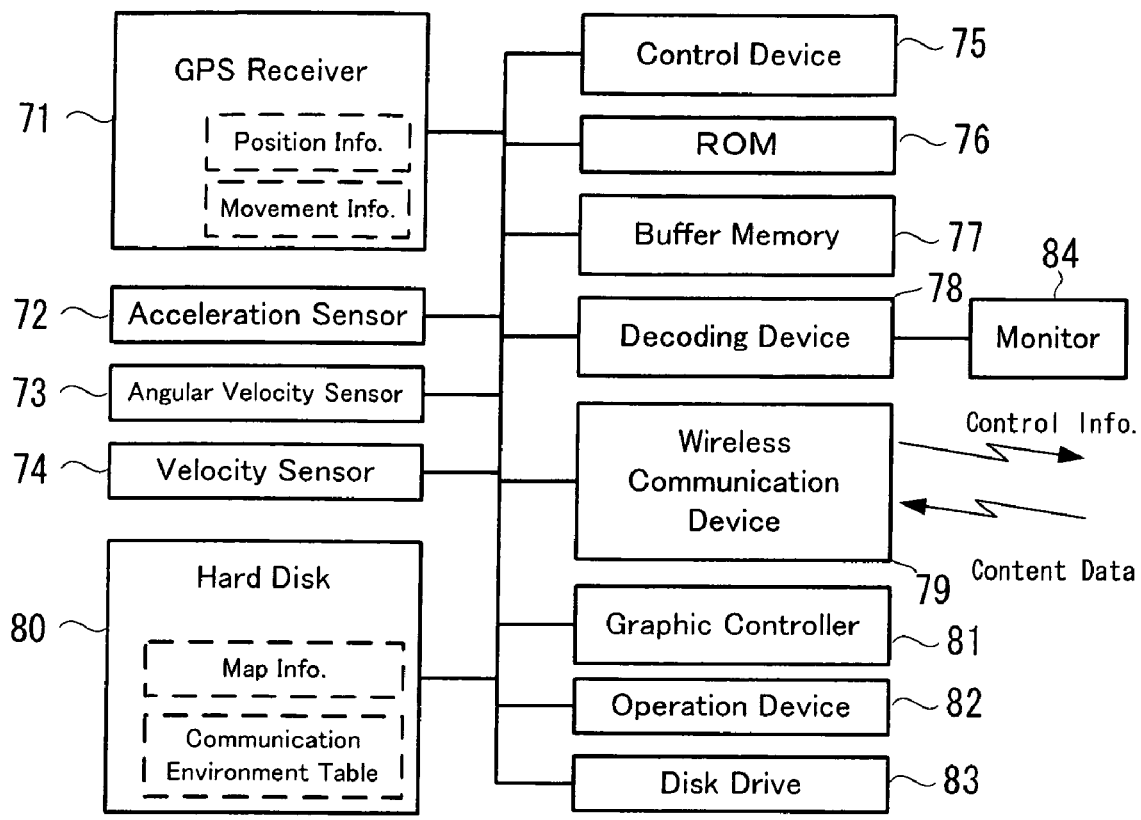
FIG. 13 is a block diagram showing a mobile receiving apparatus in the example of the remote reproduction system of the present invention.

FIG. 13 shows the internal structure of the car navigation apparatus 70. The car navigation apparatus 70 has a function as the mobile receiving apparatus for receiving the content data of music or movies which is transmitted from the DVD recorder 60 and for reproducing the content data. The car navigation apparatus 70 is mounted on a car, and moves along with the car. Hereinafter, the car equipped with the car navigation apparatus 70 is referred to a "self-car".

As shown in FIG. 13, the car navigation apparatus 70 is provided with: a GPS receiver 71; an acceleration sensor 72; an angular velocity sensor 73; a velocity sensor 74; a control device 75; a ROM 76; a buffer memory 77; a decoding device 78; a wireless communication device 79; a hard disk 80; a graphic controller 81; an operation device 82; and a disk drive 83. The decoding device 78 is connected to a monitor 84.

The GPS receiver 71 detects the current position of the self-car on the basis of the GPS positioning method, and provides the position information. The position information is a value of latitude and longitude which represents the current position of the self-car. If errors are large only in using the position information which is obtained on the basis of the GPS positioning method, the errors of the position information are corrected on the basis of autonomous navigation and map matching.

The acceleration sensor 72, the angular velocity sensor 73, and the velocity sensor 74 detect the movement direction and the movement velocity of the self-car, and provide the movement information which indicates them.

The control device 75 has a function as the estimating device for estimating the communication condition between the DVD recorder 60 and the car navigation apparatus 70 at the future position of the self-car. Specifically, the control device 75 is an operation processing device. The ROM 76 stores therein a control program which describes the function as the estimating device. Then, the control device 75 reads and executes this control program from the ROM 76, to thereby perform the function as the estimating device.

The buffer memory 77 temporarily stores therein the content data transmitted from the DVD recorder 60. The buffer memory 77 is a semiconductor memory (e.g. DRAM: Dynamic Random Access Memory).

The decoding device 78 reproduces the content data stored in the buffer memory 77. The decoding device 78 has a circuit to perform morphing, in addition to a decoder. The video images reproduced by the decoding device 78 are displayed on the monitor 84.

The wireless communication device 79 transmits the control information necessary to change the transmission rate of the content data, to the DVD recorder 60, in accordance with the communication condition estimated by the control device 75. Moreover, the wireless communication device 79 receives the content data from the DVD recorder 60. The wireless communication device 79 is provided with a wireless receiver and a wireless transmitter.

The hard disk 80 stores therein the map information and a communication environment table such that they can be held for a long time. The communication environment table is data which described in advance the evaluation of good or bad communication environments at a plurality of positions on earth. Specifically, the communication environment table is data in which the ground and underground in Japan are divided into 100 meter square areas, in which the good or bad communication environment of each area is evaluated, and in which the evaluation result is recorded for each area. Each area on the communication environment table is associated with the map information. By this, if the position of the self-car can be detected or determined on the map information, it is possible to determine which area of the communication environment table includes the position, and moreover, it is possible to recognize the evaluation of the communication environment in the area including the position.

The graphic controller 81 performs an advanced image process in order to display a map for the car navigation, on the monitor 84, as 3D images, for example. The operation device 82 is a user interface to input a command to the car navigation apparatus 70. The disk drive 83 is provided to update the map information through a recording disk, or perform a similar process.

Figure 14:
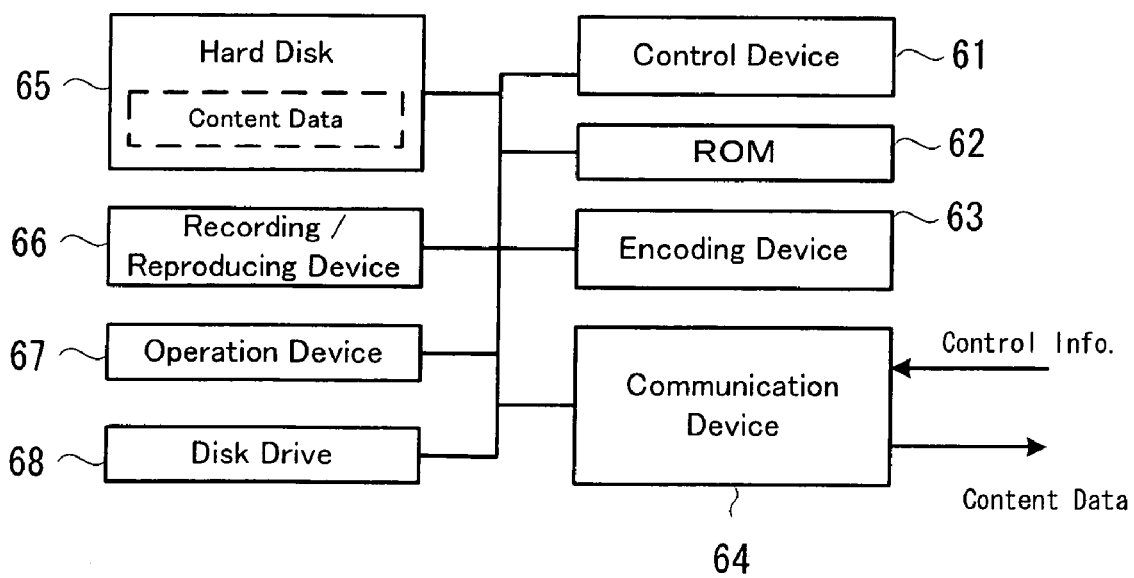
FIG. 14 is a block diagram showing a transmitting apparatus in the example of the remote reproduction system of the present invention.

FIG. 14 shows the internal structure of the DVD recorder 60. The DVD recorder 60 has a function as the transmitting apparatus for transmitting the content data to the car navigation apparatus 70. The DVD recorder 60 is left at home of a user, for example.

As shown in FIG. 14, the DVD recorder 60 is provided with: a control device 61; a ROM 62; an encoding device 63; a communication device 64; a hard disk 65; a recording/reproducing device 66; an operation device 67; and a disk drive 68.

The control device 61 has a function as the rate changing device for changing the transmission rate of the content data, in accordance with the communication condition estimated on the car navigation apparatus 70. Moreover, the control device 61 also has a function as the transmission stopping device for temporarily stopping the transmission of the content data performed by the communication device 64, in accordance with the communication condition estimated on the car navigation apparatus 70. Specifically, the control device 61 is an operation processing device. The ROM 62 stores therein a control program which describes the functions as the rate changing device and the transmission stopping device. Then, the control device 61 reads and executes this control program from the ROM 62, to thereby perform the functions as the rate changing device and the transmission stopping device.

The encoding device 63 encodes (compresses) the content data in order to transmit the content data. The encoding device 63 can change the encoding rate of the content data, under the control of the control device 61.

The communication device 64 receives the control information from the car navigation apparatus 70. Moreover, the communication device 64 transmits the content data to the car navigation apparatus 70, in accordance with the transmission rate changed by the control device 61 and the encoding device 63.

The hard disk 65 stores therein the content data such that it can be held for a long time.

The recording/reproducing device 66 performs an encoding process and other processes for recording the content data which is obtained by the Internet distribution or TV broadcast onto the hard disk 60. Moreover, the recording/reproducing device 66 performs a decoding process and other processes for reproducing the content data by using a monitor (not-illustrated) directly connected to the DVD recorder 60. These functions of the recording/reproducing device 66 are performed independently of the remote reproduction system 100. The operation device 67 is a user interface to input a command to the DVD recorder 60. The disk drive 68 is provided in order to directly reproduce the content data or the like, which is recorded on the recording disk, or transfer the content data to the hard disk 65, or record the content data stored on the hard disk 65, onto the recording disk.

The remote reproduction system 100 provided with the above construction operates as follows. A user is traveling in a car (self-car) equipped with the car navigation apparatus 70. In this situation, if the user inputs an instruction to start the reproduction of music or movies to the car navigation apparatus 70, communication is started between the DVD recorder 60 and the car navigation apparatus 70. At first, the communication device 64 of the DVD recorder 60 transmits the content data to the car navigation apparatus 70. At this time, if the communication condition is good between the DVD recorder 60 and the car navigation apparatus 70, the control device 61 and the encoding device 63 of the DVD recorder 60 set the transmission rate of the content data to the rate standard value. By this, the content data is transmitted at the transmission rate with the rate standard value. The wireless communication device 79 of the car navigation apparatus 70 receives the content data from the communication device 64 of the DVD recorder 60, and stores it into the buffer memory 77. When the amount of the content data stored in the buffer memory 77 slightly exceeds the buffer set value, the decoding device 78 reads the content data stored in the buffer memory 77, and starts the reproduction of the content data.

During the reproduction of the content data, the GPS receiver 71 sequentially detects the position of the self-car in motion, and sequentially updates the position information. The acceleration sensor 72, the angular velocity sensor 73, and the velocity sensor 74 sequentially detect the movement of the self-car in motion, and sequentially update the movement information. The control device 75 of the car navigation apparatus 70 obtains the position information and the movement information, and refers to the map information and the communication environment table stored in the hard disk 80, to thereby sequentially estimate the communication condition at the future position of the self-car. The wireless communication device 79 sequentially generates and updates the control information, on the basis of the estimation result of the control device 75, and sequentially transmits the control information to the DVD recorder 60.

The communication device 64 of the DVD recorder 60 sequentially receives the control information from the wireless communication device 79 of the car navigation apparatus 70. The control device 61 and the encoding device 63 of the DVD recorder 60 change the transmission rate of the content data on the basis of the control information. Since the control information is sequentially updated, the control device 61 and the encoding device 63 change the transmission rate of the content data every time the control information is updated. Basically, the control device 61 and the encoding device 63 reduce the transmission rate of the content data to have a lower value than the standard value if it is estimated that the communication condition at the future position of the self-car is bad. By this, when the communication condition at the future position of the self-car is bad, the amount per unit time of the content data which is transmitted from the DVD recorder 60 to the car navigation apparatus 70 becomes small. On the other hand, the control device 61 and the encoding device 63 increase the transmission rate of the content data to the standard value if it is estimated that the communication condition at the future position of the self-car is good. By this, when the communication condition at the future position of the self-car is good, the amount per unit time of the content data which is transmitted from the DVD recorder 60 to the car navigation apparatus 70 becomes large.

On the other hand, for example, if it is estimated that the communication condition at the future position of the self-car is very bad, the control device 61 stops the transmission of the content data performed by the communication device 64. After that, if the communication condition becomes good, the control device 61 restarts the transmission of the content data performed by the communication device 64.

Figure 15:
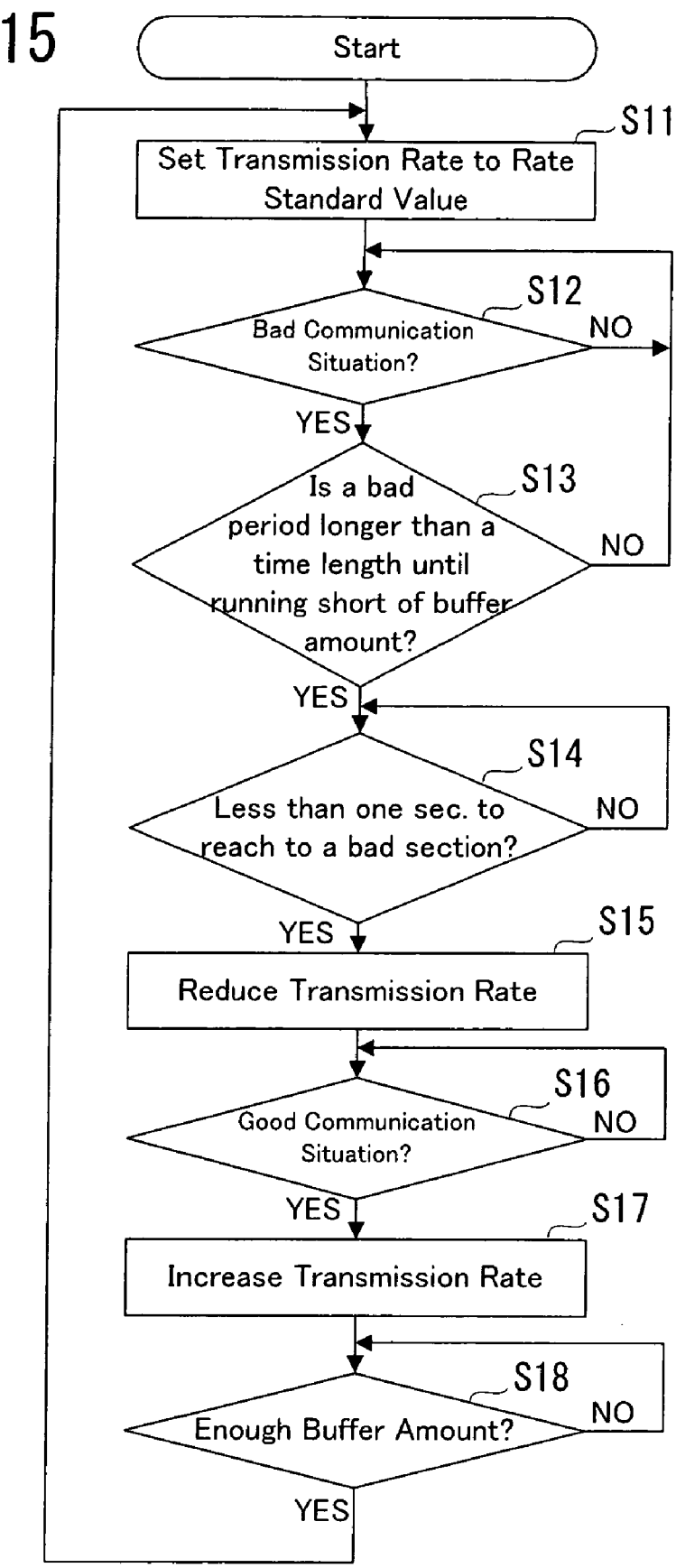
FIG. 15 is a flowchart showing control related to estimation of a communication condition and change of a transmission rate in the example of the remote reproduction system of the present invention.

Hereinafter, control related to the estimation of the communication condition and the change of the transmission rate will be specifically discussed in the remote reproduction system 100. FIG. 15 shows a flow of the control related to the estimation of the communication condition and the change of the transmission rate in the remote reproduction system 100.

As shown in FIG. 15, when the transmission of the content data is started from the DVD recorder 60 to the car navigation apparatus 70, the control device 61 and the encoding device 63 of the DVD recorder 60 set the transmission rate of the content data to the rate standard value (step S11).

Then, the control device 75 of the car navigation apparatus 70 estimates the communication condition at the future position of the self-car in motion, and determines whether or not the communication condition is bad (step S12). If the communication condition is bad (the step S12: YES), the control device 75 determines whether or not a period in which the communication condition is bad is longer than a time length until the buffer memory 77 has a shortage of the buffer amount (step S13). Namely, if the communication condition is bad, in the worst case, the communication cannot be made. If the communication cannot be made, the content data stored in the buffer memory 77 is consumed for the reproduction process, and the buffer amount is greatly reduced. If the not-communicable period is long, the buffer amount becomes insufficient, and the buffer memory 77 gets into the underflow condition, which results in problems in the continuing reproduction. Thus, in the step S13, it is assumed that the bad communication condition causes the communication incapability, so that it is determined whether or not the period in which the communication condition is bad, i.e., the not-communicable period, is longer than a time length until the buffer memory 77 has a shortage of the buffer amount.

If the period in which the communication condition is bad is temporal, and the period is not longer than the time length until the buffer memory 77 has a shortage of the buffer amount (the step S13: NO), the buffer memory 77 does not have a shortage of the buffer amount, and there is no problem in the continuing reproduction. Then, the control returns to the step S12.

On the other hand, if the period in which the communication condition is bad is longer than the time length until the buffer memory 77 has a shortage of the buffer amount (the step S13: YES), then, the control device 75 determines whether or not it takes less than one second for the self-car to reach a section in which the communication condition is bad from the current position (step S14). This determination can be performed on the basis of the information about the current position of the self-car, the movement direction, the movement velocity, or the like, which are obtained form the GPS receiver 71, the acceleration sensor 72, the angular velocity sensor 73, and the velocity sensor 74.

If it takes less than one second for the self-car to reach a section in which the communication condition is bad from the current position (the step S14: YES), the control device 75 uses the wireless communication device 79 to transmit a command to reduce the transmission rate of the content data, to the DVD recorder 60. The DVD recorder 60 receives this command through the communication device 64. Then, the control device 61 and the encoding device 63 of the DVD recorder 60 reduce the transmission rate of the content data and set it to have a lower value than the rate standard value (step S15).

Then, the control device 75 of the car navigation apparatus 70 estimates the communication condition at the future position of the self-car in motion, and determines whether or not the communication condition becomes good (step S16).

If the communication condition becomes good (the step S16: YES), the control device 75 uses the wireless communication device 79 to transmit a command to increase the transmission rate of the content data, to the DVD recorder 60.

The DVD recorder 60 receives this command through the communication device 64. Then, the control device 61 and the encoding device 63 of the DVD recorder 60 increase the transmission rate of the content data and set it to have a higher value than the rate standard value (step S17). This rapidly increases the buffer amount of the buffer memory 77. By this, even if the buffer amount is greatly below the buffer set value because of the reduction of the transmission rate in the period in which the communication condition is bad, it is possible to quickly recover the buffer amount to the buffer set value or a slightly larger value than this.

Then, the control device 75 of the car navigation apparatus 70 determines whether or not the buffer amount of the buffer memory 77 reaches a slightly larger amount than the buffer set value, i.e., an amount large enough to continue the reproduction (step S18).

When the buffer amount of the buffer memory 77 reaches a slightly larger amount than the buffer set value, the control returns to the step S11. Then, the process after the step S11 is repeated.

Next, control related to the estimation of the communication condition and the stop of the transmission will be specifically discussed in the remote reproduction system 100. FIG. 16 is a flowchart showing the control related to the estimation of the communication condition and the stop of the transmission in the remote reproduction system 100.

The process from the step S21 to the step S24 in FIG. 16 is the same as the process from the step S11 to the step S14 in FIG. 15.

As a result of the determination in the step S24, if it takes less than one second for the self-car to reach a section in which the communication condition is bad from the current position (the step S24: YES), the control device 75 uses the wireless communication device 79 to transmit a command to stop the transmission of the content data, to the DVD recorder 60. The DVD recorder 60 receives this command through the communication device 64. Then, the control device 61 of the DVD recorder 60 stops the transmission of the content data (step S25).

Then, the control device 75 of the car navigation apparatus 70 estimates the communication condition at the future position of the self-car in motion, and determines whether or not the communication condition becomes good (step S26).

If the communication condition becomes good (the step S26: YES), the control device 75 uses the wireless communication device 79 to transmit a command to restart the transmission of the content data and increase the transmission rate of the content data, to the DVD recorder 60. The DVD recorder 60 receives this command through the communication device 64. Then, the control device 61 of the DVD recorder 60 restarts the transmission of the content data and increases the transmission rate of the content data from the rate standard value (step S27).

Then, the control device 75 of the car navigation apparatus 70 determines whether or not the buffer amount of the buffer memory 77 reaches a slightly larger amount than the buffer set value, i.e., an amount large enough to continue the reproduction (step S28).

When the buffer amount of the buffer memory 77 reaches a slightly larger amount than the buffer set value, the control returns to the step S21.

Incidentally, the control shown in FIG. 15 and the control shown in FIG. 16 are changed and performed, on the basis of the extent or frequency of the deteriorating communication condition, or the length of the period in which the communication condition is bad, or the like.

Consequently, according to the remote reproduction system 100 in the example of the present invention, the communication condition is estimated between the DVD recorder 60 and the car navigation apparatus 70 at the future position of the self-car in motion, and the transmission rate of the content data is changed in accordance with the estimated communication condition. Thus, it is possible to recognize the deteriorating communication condition in advance, and it is possible to change the transmission rate in accordance with the recognition. By this, it is possible to reduce the incidence of errors even in the deteriorating communication condition, and it is also possible to maintain the transmission of the content data from the DVD recorder 60 to the car navigation apparatus 70. Therefore, it is possible to stabilize the reproduction of the content data on the car navigation apparatus 70.

Moreover, according to the remote reproduction system 100 in the example of the present invention, the transmission of the content data is temporarily stopped in accordance with the estimated communication condition. Thus, for example, when the communication condition is remarkably bad, it is possible to stop the updating the content data by stopping the communication of the content data from the DVD recorder 60 to the car navigation apparatus 70. By this, it is possible to prevent from losing the content of contents, such as music or video images, to thereby maintain the continuity of the content of the contents, such as music or video images.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2004-362363 filed on Dec. 15, 2004 including the specification, claims, drawings and summary is incorporated herein by reference in its entirety.

What is claimed is:

1. A remote reproduction system for making communication between a transmitting apparatus and a mobile receiving apparatus, which are wirelessly connected to each other, for transmitting content data from the transmitting apparatus to the mobile receiving apparatus, and for reproducing the content data on the mobile receiving apparatus, the mobile receiving apparatus comprising:

a position detecting device for detecting a current position of the mobile receiving apparatus and for providing position information which indicates the current position;

a storing device for storing therein information of communication environments which indicates communication environments at a plurality of positions, the communication environments information comprising predetermined estimation data of the respective positions with regard to goodness or badness of receiving content data;

an estimating device for estimating a communication condition between the transmitting apparatus and the mobile receiving apparatus at a future position of the mobile receiving apparatus in motion, on the basis of the position information and the communication environments information, the communication condition being estimated based on the predetermined estimation data;

a control information transmitting device for transmitting control information necessary to change a transmission rate of the content data, to the transmitting apparatus, in accordance with the communication condition estimated by the estimating device;
a data receiving device for receiving the content data from the transmitting apparatus;
a buffering device for temporarily storing the content data received by the data receiving device; and
a reproducing device for reproducing the content data stored in the buffering device,
the transmitting apparatus comprising:
a control information receiving device for receiving the control information from the mobile receiving apparatus;
a rate changing device for changing the transmission rate on the basis of the control information received by the control information receiving device; and
a data transmitting device for transmitting the content data to the mobile receiving apparatus, in accordance with the transmission rate changed by the rate changing device,
wherein the estimating device comprises:
a candidate position determining device for determining a plurality of candidate positions to which the mobile receiving apparatus will likely move in the future, on the basis of the position information and movement information; and
a selecting device for examining the communication condition at each of the plurality of candidate positions, on the basis of the communication environments information, for selecting a candidate position whose communication condition is the worst, from the plurality of candidate positions, and for providing the communication condition at the selected candidate position as an estimation result.

2. The remote reproduction system according to claim 1, wherein
the mobile receiving apparatus further comprises a movement detecting device for detecting a movement direction or a movement velocity of the mobile receiving apparatus, and for providing movement information which indicates the movement direction or the movement velocity, and
the estimating device estimates the communication condition at the future position of the mobile receiving apparatus in motion, on the basis of the position information, the movement information, and the communication environments information.

3. The remote reproduction system according to claim 1, wherein
the estimating device comprises a monitoring device for sequentially monitoring a future change in the communication condition by continuing to sequentially estimate the communication condition at a position after a lapse of time of the mobile receiving apparatus in motion, and
the rate changing device comprises a rate following device for controlling the transmission rate of the content data such that the transmission rate of the content data follows the future change of the communication condition, by continuing to sequentially change the transmission rate of the content data in accordance with the future change of the communication condition which is monitored by the monitoring device.

4. The remote reproduction system according to claim 1, wherein the communication environments information comprises data in which geographical features at a plurality of positions are written in advance.

5. The remote reproduction system according to claim 1, wherein the communication environments information comprises map information.

6. The remote reproduction system according to claim 1, wherein the rate changing device reduces the transmission rate if the communication condition at the future position is worse than that at the current position.

7. The remote reproduction system according to claim 1, wherein the rate changing device reduces the transmission rate by reducing a frame rate of the content data if the communication condition at the future position is worse than that at the current position.

8. The remote reproduction system according to claim 1, wherein the rate changing device reduces the transmission rate by increasing an encoding rate of the content data if the communication condition at the future position is worse than that at the current position.

9. The remote reproduction system according to claim 1, wherein the transmitting apparatus further comprises a transmission stopping device for temporarily stopping the transmission of the content data performed by the data transmitting device, in accordance with the communication condition estimated by the estimating device.

10. The remote reproduction system according to claim 1, wherein, if the communication condition at the future position is worse than that at the current position, the rate changing device increases the transmission rate before the mobile receiving apparatus approaches the future position and then, reduces the transmission rate after the mobile receiving apparatus approaches the future position.

11. The remote reproduction system according to claim 1, wherein, if the communication condition at the future position is better than that at the current position, the rate changing device increases the transmission rate and maintains the increased transmission rate until amount of the content data stored in the buffering device reaches a predetermined amount suitable for the reproduction of the content data.

12. The remote reproduction system according to claim 1, wherein the rate changing device changes the transmission rate to be suitable for the future position on the basis of the control information received by the control information receiving device, before the mobile receiving apparatus arrives at the future position.

13. The remote reproduction system according to claim 1, wherein the mobile receiving apparatus is a car navigation apparatus.

14. The remote reproduction system according to claim 13, further comprising:
a route guidance information generating device for generating route guidance information to a destination,
wherein the estimating device estimates a communication condition between the transmitting apparatus and the car navigation apparatus at a future position of the car navigation apparatus in motion, on the basis of the position information, the communication environments information and the route guidance information.

15. A remote reproduction system for making communication between a transmitting apparatus and a mobile receiving apparatus, which are wirelessly connected to each other, for transmitting content data from the transmitting apparatus to the mobile receiving apparatus, and for reproducing the content data on the mobile receiving apparatus,
the mobile receiving apparatus comprising:
a position detecting device for detecting a current position of the mobile receiving apparatus and for providing position information which indicates the current position;

a position information transmitting device for transmitting the position information to the transmitting apparatus;

a data receiving device for receiving the content data from the transmitting apparatus;

a buffering device for temporarily storing the content data received by the data receiving device; and a reproducing device for reproducing the content data stored in the buffering device, the transmitting apparatus comprising:

a position information receiving device for receiving the position information from the mobile receiving apparatus;

a storing device for storing therein information of communication environments which indicates communication environments at a plurality of positions, the communication environments information comprising predetermined estimation data of the respective positions with regard to goodness or badness of receiving content data;

an estimating device for estimating a communication condition between the transmitting apparatus and the mobile receiving apparatus at a future position of the mobile receiving apparatus in motion, on the basis of the position information and the communication environments information, the communication condition being estimated based on the predetermined estimation data;

a rate changing device for changing a transmission rate, in accordance with the communication condition estimated by the estimating device; and a data transmitting device for transmitting the content data to the mobile receiving apparatus, in accordance with the transmission rate changed by the rate changing device, wherein the estimating device comprises:

a candidate position determining device for determining a plurality of candidate positions to which the mobile receiving apparatus will likely move in the future, on the basis of the position information and movement information; and a selecting device for examining the communication condition at each of the plurality of candidate positions, on the basis of the communication environments information, for selecting a candidate position whose communication condition is the worst, from the plurality of candidate positions, and for providing the communication condition at the selected candidate position as an estimation result.

16. The remote reproduction system according to claim 15, wherein the mobile receiving apparatus further comprises:

a movement detecting device for detecting a movement direction or a movement velocity of the mobile receiving apparatus, and for providing movement information which indicates the movement direction or the movement velocity; and a movement information transmitting device for transmitting the movement information to the transmitting apparatus, the transmitting apparatus further comprises a movement information receiving device for receiving the movement information from the mobile receiving apparatus, and the estimating device estimates the communication condition at the future position of the mobile receiving apparatus in motion, on the basis of the position information, the movement information, and the communication environments information.

17. The remote reproduction system according to claim 15, wherein the rate changing device changes the transmission rate to be suitable for the future position in accordance with the communication condition estimated by the estimating device, before the mobile receiving apparatus arrives at the future position.

18. A mobile receiving apparatus for making communication with a transmitting apparatus to which the mobile receiving apparatus is wirelessly connected, for receiving content data from the transmitting apparatus, and for reproducing the content data, the mobile receiving apparatus comprising:

a position detecting device for detecting a current position of the mobile receiving apparatus and for providing position information which indicates the current position;

a storing device for storing therein information of communication environments which indicates communication environments at a plurality of positions, the communication environments information comprising predetermined estimation data of the respective positions with regard to goodness or badness of receiving content data;

an estimating device for estimating a communication condition between the transmitting apparatus and the mobile receiving apparatus at a future position of the mobile receiving apparatus in motion, on the basis of the position information and the communication environments information, the communication condition being estimated based on the predetermined estimation data;

a control information transmitting device for transmitting control information necessary to change a transmission rate of the content data, to the transmitting apparatus, in accordance with the communication condition estimated by the estimating device;

a data receiving device for receiving the content data from the transmitting apparatus;

a buffering device for temporarily storing the content data received by the data receiving device; and a reproducing device for reproducing the content data stored in the buffering device, wherein the estimating device comprises:

a candidate position determining device for determining a plurality of candidate positions to which the mobile receiving apparatus will likely move in the future, on the basis of the position information and movement information; and a selecting device for examining the communication condition at each of the plurality of candidate positions, on the basis of the communication environments information, for selecting a candidate position whose communication condition is the worst, from the plurality of candidate positions, and for providing the communication condition at the selected candidate position as an estimation result.

19. The mobile receiving apparatus according to claim 18, wherein the mobile receiving apparatus further comprises a movement detecting device for detecting a movement direction or a movement velocity of the mobile receiving apparatus, and for providing movement information which indicates the movement direction or the movement velocity, and the estimating device estimates the communication condition at the future position of the mobile receiving apparatus in motion, on the basis of the position information, the movement information, and the communication environments information.

20. A transmitting apparatus for making communication with a mobile receiving apparatus to which the transmitting apparatus is wirelessly connected, and for transmitting content data to the mobile receiving apparatus so as to reproduce the content data on the mobile receiving apparatus, the transmitting apparatus comprising:

a position information receiving device for receiving position information, which indicates a current position of the mobile receiving apparatus, from the mobile receiving apparatus;

a storing device for storing therein information of communication environments which indicate communication environments at a plurality of positions, the communication environments information comprising predetermined estimation data of the respective positions with regard to goodness or badness of receiving content data;

an estimating device for estimating a communication condition between the transmitting apparatus and the mobile receiving apparatus at a future position of the mobile receiving apparatus in motion, on the basis of the position information and the communication environments information, the communication condition being estimated based on the predetermined estimation data;

a rate changing device for changing a transmission rate, in accordance with the communication condition estimated by the estimating device; and a data transmitting device for transmitting the content data to the mobile receiving apparatus, in accordance with the transmission rate changed by the rate changing device, wherein the estimating device comprises:

a candidate position determining device for determining a plurality of candidate positions to which the mobile receiving apparatus will likely move in the future, on the basis of the position information and movement information; and a selecting device for examining the communication condition at each of the plurality of candidate positions, on the basis of the communication environments information, for selecting a candidate position whose communication condition is the worst, from the plurality of candidate positions, and for providing the communication condition at the selected candidate position as an estimation result.

21. The transmitting apparatus according to claim 20, wherein the transmitting apparatus further comprises a movement information receiving device for receiving movement information, which indicates a movement direction or a movement velocity of the mobile receiving apparatus, from the mobile receiving apparatus, and the estimating device estimates the communication condition at the future position of the mobile receiving apparatus in motion, on the basis of the position information, the movement information, and the communication environments information.

22. A remote reproduction method of making communication between a transmitting apparatus and a mobile receiving apparatus, which are wirelessly connected to each other, of transmitting content data from the transmitting apparatus to the mobile receiving apparatus, and of reproducing the content data on the mobile receiving apparatus, the remote reproduction method comprising:

a position detecting process of detecting a current position of the mobile receiving apparatus;

a movement detecting process of detecting movement of the mobile receiving apparatus;

an estimating process of estimating a communication condition between the transmitting apparatus and the mobile receiving apparatus at a future position of the mobile receiving apparatus in motion, on the basis of the current position of the mobile receiving apparatus which is detected in the position detecting process, the movement of the mobile receiving apparatus which is detected in the movement detecting process, and information of communication environments indicating communication environments at a plurality of positions, which are stored in advance, the communication environments information comprising predetermined estimation data of the respective positions with regard to goodness or badness of receiving content data, the communication condition being estimated based on the predetermined estimation data;

a rate changing process of changing a transmission rate, in accordance with the communication condition estimated in the estimating process; and a data transmitting process of transmitting the content data from the transmitting apparatus to the mobile receiving apparatus, in accordance with the transmission rate changed in the rate changing process, wherein the estimating process comprises:

a candidate position determining process of determining a plurality of candidate positions to which the mobile receiving apparatus will likely move in the future, on the basis of the position information and movement information; and a selecting process of examining the communication condition at each of the plurality of candidate positions, on the basis of the communication environments information, for selecting a candidate position whose communication condition is the worst, from the plurality of candidate positions, and for providing the communication condition at the selected candidate position as an estimation result.

23. The remote reproduction method according to claim 22, wherein a movement direction or a movement velocity of the mobile receiving apparatus is detected in the movement detecting process.

24. A computer program, stored in a non-transitory computer-readable medium, for realizing a remote reproduction method of transmitting content data from a first computer to a second computer and of reproducing the content data on the second computer, in a computer system comprising the first computer and the second computer, which are wirelessly connected to each other and which can mutually make communication, the program, when executed by a processor, performing steps comprising:

a position detecting process of detecting a current position of the second computer;

a movement detecting process of detecting movement of the second computer;

an estimating process of estimating a communication condition between the first computer and the second computer at a future position of the second computer in motion, on the basis of the current position of the second computer which is detected in the position detecting process, the movement of the second computer which is detected in the movement detecting process, and information of communication environments indicating communication environments at a plurality of positions, which are stored in advance, the communication environments information comprising predetermined estimation data of the respective positions with regard to goodness or badness of receiving content data, the communication condition being estimated based on the predetermined estimation data;

a rate changing process of changing a transmission rate, in accordance with the communication condition estimated in the estimating process; and a data transmitting process of transmitting the content data from the first computer to the second computer, in accordance with the transmission rate changed in the rate changing process, wherein the estimating process comprises:

a candidate position determining process of determining a plurality of candidate positions to which the mobile receiving apparatus will likely move in the future, on the basis of the position information and movement information; and a selecting process of examining the communication condition at each of the plurality of candidate positions, on the basis of the communication environments information, for selecting a candidate position whose communication condition is the worst from the plurality of candidate positions, and for providing the communication condition at the elected candidate position as an estimation result.

25. The computer program according to claim 24, wherein a movement direction or a movement velocity of the second computer is detected in the movement detecting process.

* * * * *